US008711182B2

(12) United States Patent
Ikeda et al.

(10) Patent No.: US 8,711,182 B2
(45) Date of Patent: Apr. 29, 2014

(54) INFORMATION PROCESSING APPARATUS AND DISPLAY CONTROL METHOD

(75) Inventors: Tetsuo Ikeda, Tokyo (JP); Ryu Aoyama, Kanagawa (JP); Takehiko Tsurumi, Tokyo (JP); Shoichiro Moriya, Tokyo (JP); Fuminori Homma, Tokyo (JP)

(73) Assignee: Sony Corporation, Tokyo (JP)

( * ) Notice: Subject to any disclaimer, the term of this patent is extended or adjusted under 35 U.S.C. 154(b) by 380 days.

(21) Appl. No.: 12/693,958

(22) Filed: Jan. 26, 2010

(65) Prior Publication Data

US 2010/0188423 A1    Jul. 29, 2010

(30) Foreign Application Priority Data

Jan. 28, 2009   (JP) ................. P2009-017193

(51) Int. Cl.
*G09G 5/00*    (2006.01)
(52) U.S. Cl.
USPC .................... 345/661; 345/665; 345/667
(58) Field of Classification Search
None
See application file for complete search history.

(56) References Cited

U.S. PATENT DOCUMENTS

| 7,656,393 | B2 * | 2/2010 | King et al. ............. 345/173 |
| 7,676,754 | B2 * | 3/2010 | Basson et al. .......... 715/762 |
| 2002/0036618 | A1 | 3/2002 | Wakai et al. |
| 2006/0001650 | A1 * | 1/2006 | Robbins et al. ......... 345/173 |
| 2007/0177803 | A1 * | 8/2007 | Elias et al. ............. 382/188 |
| 2007/0222767 | A1 | 9/2007 | Wang |
| 2008/0046425 | A1 * | 2/2008 | Perski ................. 707/6 |
| 2009/0207142 | A1 * | 8/2009 | Keranen ............... 345/173 |
| 2010/0073303 | A1 * | 3/2010 | Wu et al. .............. 345/173 |
| 2010/0105443 | A1 * | 4/2010 | Vaisanen .............. 455/566 |
| 2010/0149114 | A1 * | 6/2010 | Li ...................... 345/173 |

FOREIGN PATENT DOCUMENTS

| EP | 1942401 A1 | 7/2008 |
| JP | 09-128149 | 5/1997 |
| JP | 11-073271 | 3/1999 |
| JP | 2005-182367 | 7/2005 |
| JP | 2007-116336 | 5/2007 |
| JP | 2007-279638 | 10/2007 |
| JP | 2008-181523 | 8/2008 |

OTHER PUBLICATIONS

English-language European Search Report in corresponding EP 09252732.4, mailed Aug. 23, 2011.

* cited by examiner

*Primary Examiner* — James A Thompson
*Assistant Examiner* — David H Chu
(74) *Attorney, Agent, or Firm* — Sherr & Jiang, PLLC

(57) ABSTRACT

An information processing apparatus is provided which includes a display unit on which an object is displayed, a position detector for detecting a position of an operating tool that is made to contact a surface of the display unit, a reference position determination unit for determining as a reference position a position of an operating tool that is detected first by the position detector when a plurality of operating tools are made to contact the display unit, a display change operation specifying unit for specifying, according to a moving direction of a position of an operating tool that is detected N-th (N≥2) by the position detector, a specific display change operation associated with the direction, and a display controller for performing on the object the display change operation specified by the display change operation specifying unit with the reference position determined by the reference position determination unit as a reference.

20 Claims, 13 Drawing Sheets

FIG.1A BEFORE ENLARGEMENT  EXAMPLE OF ENLARGEMENT OPERATION
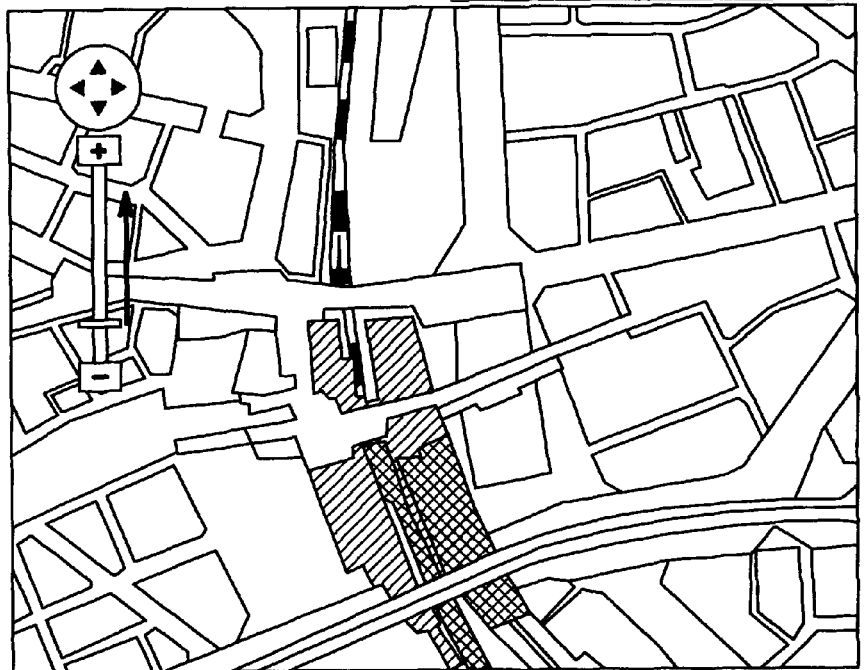
FIG.1B AFTER ENLARGEMENT  (ENLARGEMENT OPERATION)
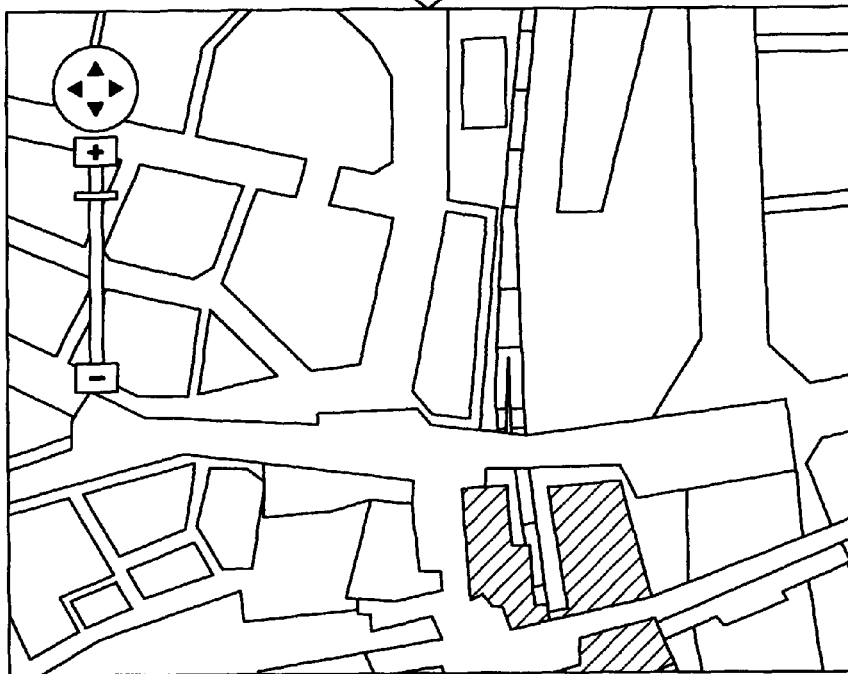

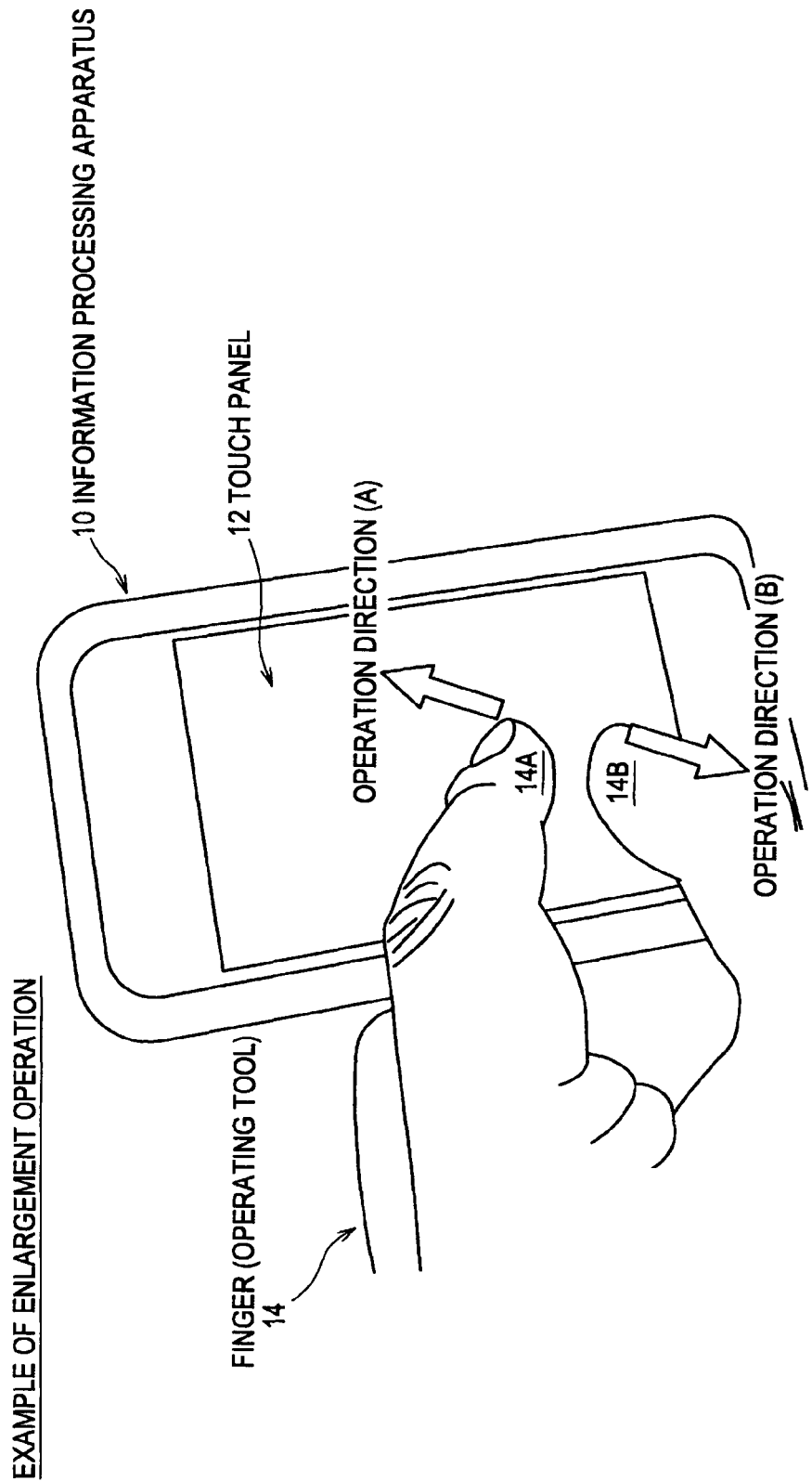

INFORMATION PROCESSING APPARATUS AND DISPLAY CONTROL METHOD

BACKGROUND OF THE INVENTION

1. Field of the Invention

The present invention relates to an information processing apparatus and a display control method.

2. Description of the Related Art

In recent years, many small electronic devices and automatic transaction machines are mounted with a touch panel for a user to directly touch the display screen and operate an object displayed on the screen. By using a touch panel, an advantage is obtained that an intuitive operation feeling is realized and even a user not used to an operation of a keyboard, a keypad, or the like, can easily perform the operation. According to some of recent electronic devices, a display object that is displayed on a screen is moved by a user operating the touch panel, or specific processing is executed by the movement operation.

For example, JP-A-2007-279638 discloses a technology relating to a navigation device adopting a touch panel for an input tool. The technology enables an enlargement/reduction operation of a map displayed on a touch panel by two fingers making contact with the touch panel and one finger being linearly moved. Particularly, the technology has its feature in changing the magnification rate according to the distance between two points specified by separating the two fingers.

SUMMARY OF THE INVENTION

However, when moving two fingers at the same time, it is difficult to subtly adjust the distance between the fingers. Also, a position which is a reference for the enlargement or the reduction is hard to perceive. For example, a method can be conceived according to which the enlargement operation is performed after tapping a reference point by a finger or the like to specify a position to be the reference, but then, operation process will increase due to the tapping operation. Moreover, this problem will arise not only for the enlargement operation and the reduction operation, but also for a user operation for changing a display based on a position which is the reference.

Thus, in light of the foregoing, it is desirable to provide novel and improved information processing apparatus and display control method according to which a position to be a reference for display change is easy to perceive and a change operation of a display can be performed with a small number of operation processes.

According to an embodiment of the present invention, there is provided an information processing apparatus including a display unit on which an object is displayed, a position detection unit for detecting a position of an operating tool that is made to contact a surface of the display unit or that is brought into proximity thereof, a reference position determination unit for determining as a reference position a position of an operating tool that is detected first by the position detection unit when a plurality of operating tools are made to contact the display unit or are brought into proximity thereof, a display change operation specifying unit for specifying, according to a moving direction of a position of an operating tool that is detected N-th (N≥2) by the position detection unit, a specific display change operation associated with the direction, and a display control unit for performing on the object the display change operation specified by the display change operation specifying unit with the reference position determined by the reference position determination unit as a reference.

Furthermore, the display control unit may be configured to include a reference indicator display unit for making the display unit display, when a reference position is determined by the reference position determination unit, a reference indicator indicating the reference position, and a change indicator display unit for making the display unit display, when a specific display change operation is specified by the display change operation specifying unit, change indicators each indicating a type of the specific display change operation or a change amount by the specific display change operation.

Furthermore, the information processing apparatus may further include a type detection unit for detecting a type of the operating tool whose position was detected by the position detection unit. Also, when operating tools of mutually different types are detected by the type detection unit, the reference position determination unit may determine as a reference a position of the operating tool of a first type detected by the position detection unit. In this case, the display change operation specifying unit is configured to specify, according to a moving direction of a position of the operating tool of a second type detected by the position detection unit that is different from the first type, a specific display change operation associated with the direction.

Furthermore, when the operating tool that is detected N-th is moved in a direction associated with an enlargement operation or a reduction operation, the display control unit may enlarge or reduce the object with the reference position determined by the reference position determination unit as a centre.

Furthermore, when the operating tool that is detected N-th is moved in a direction associated with a rotation operation, the display control unit may rotate the object with the reference position determined by the reference position determination unit as a centre.

Furthermore, the display unit may include a display area where the object is displayed and a non-display area provided outside the display screen where the object is not displayed. In this case, when a position of the operating tool is included in the display area, the reference position determination unit determines the position of the operating tool to be the reference position. Also, the display change operation specifying unit is configured to specify, when the position of the operating tool is included in the non-display area, the specific display change operation according to a moving direction of the operating tool.

According to another embodiment of the present invention, there is provided a display control method including the steps of detecting a position of an operating tool that is made to contact a surface of a display unit on which an object is displayed or that is brought into proximity thereof, determining as a reference position a position of an operating tool that is detected first in the step of detecting when a plurality of operating tools are made to contact the display unit or are brought into proximity thereof, specifying, according to a moving direction of a position of an operating tool that is detected N-th (N≥2) in the step of detecting, a specific display change operation associated with the direction, and performing on the object the display change operation specified in the step of specifying with the reference position determined in the step of determining as a reference.

According to another embodiment of the present invention, there is provided a program capable of causing a computer to realize the function of each structural element included in the information processing apparatus. Also, according to another embodiment of the present invention, there may be provided a recording medium in which the program is recorded, the recording medium being able to be read by a computer.

According to the embodiments of the present invention described above, there is provided a novel and improved information processing apparatus and a display control method according to which a position to be a reference for display change is easy to perceive and a change operation of a display can be performed with a small number of operation processes.

BRIEF DESCRIPTION OF THE DRAWINGS

FIG. 1 is an explanatory diagram showing an example of an enlargement operation method;

FIG. 2 is an explanatory diagram showing an example of the enlargement operation method;

DETAILED DESCRIPTION OF THE EMBODIMENT(S)

Figure 3:
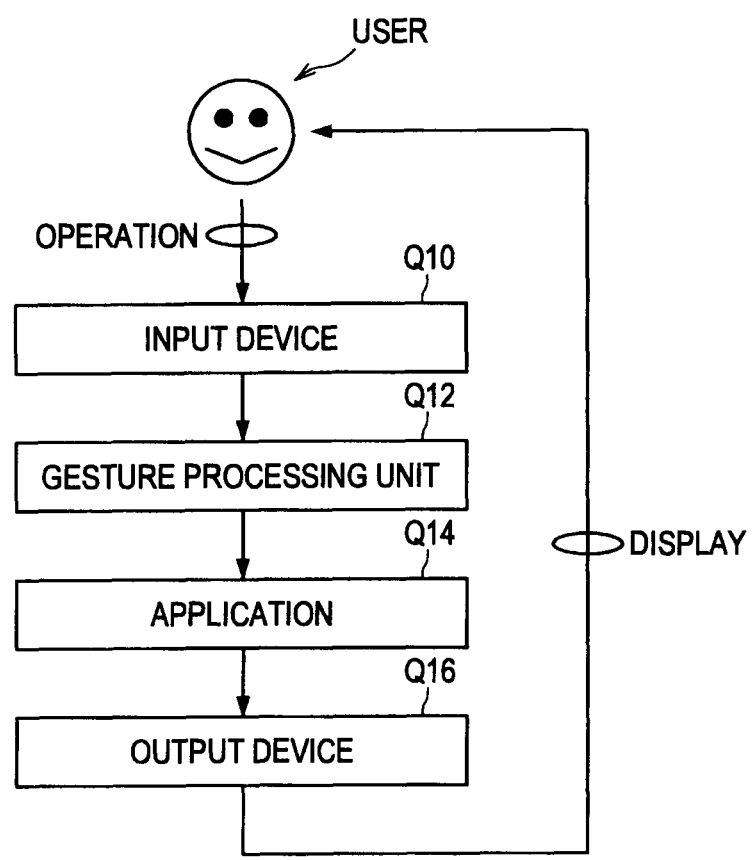
FIG. 3 is an explanatory diagram for schematically explaining a system configuration for realizing a display control method according to an embodiment of the present invention and a series of operations or a process flow.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Explanation>

Here, a flow of explanation of an embodiment of the present invention described below will be briefly stated. First, referring to FIGS. 1 and 2, enlargement operation methods as examples of change/adjustment methods of display setups will be described. Then, referring to FIG. 3, a summary of architecture of information processing apparatuses 100, 200 and 300 according to an embodiment of the present invention will be described.

Figure 4:
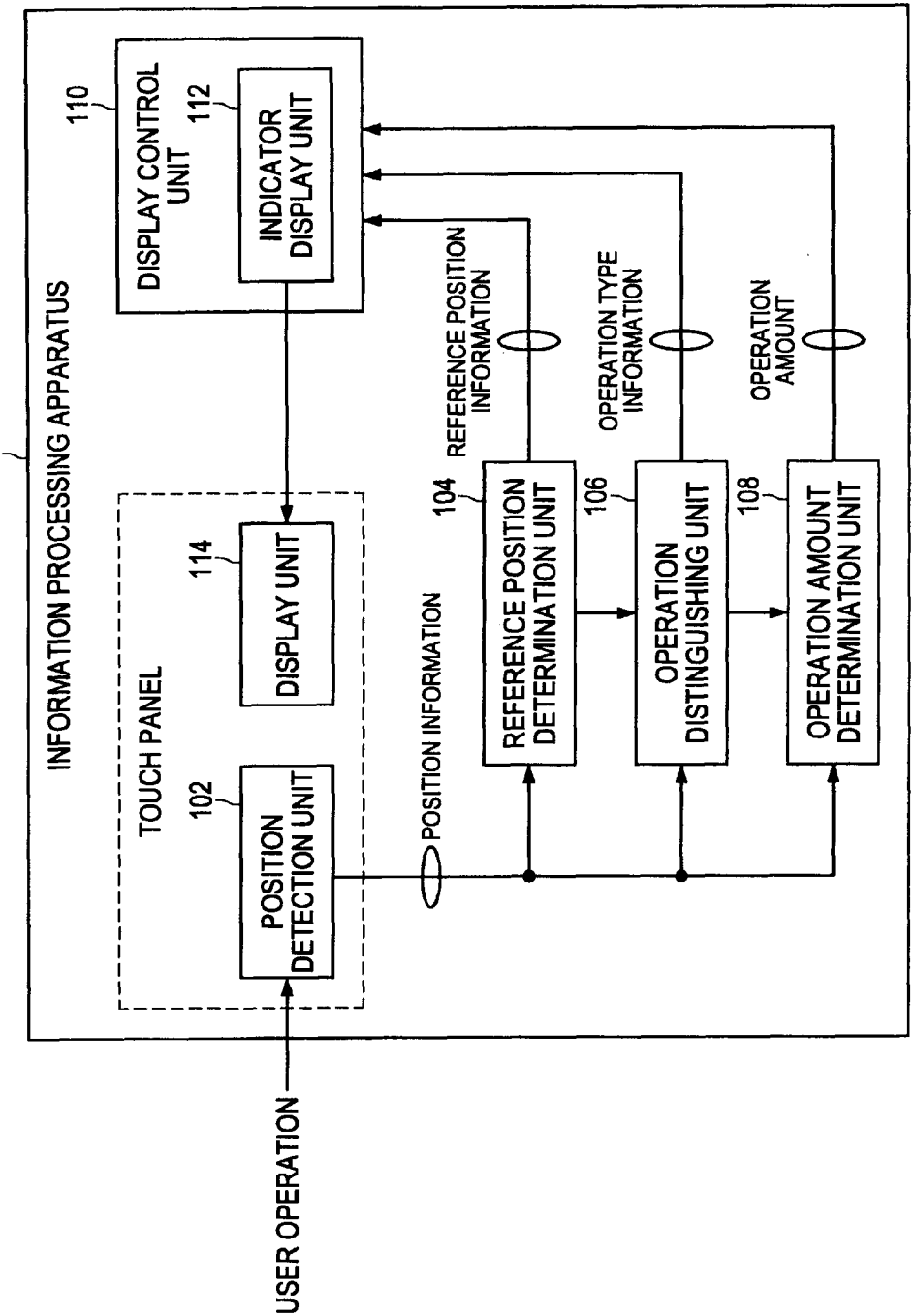
FIG. 4 is an explanatory diagram showing a functional configuration example of an information processing apparatus according to the present embodiment.

Next, referring to FIG. 4, a functional configuration of the information processing apparatus 100 according to the present embodiment will be described in detail. At the same time, referring to FIGS. 5 and 6, an operation input method and a display control method according to the present embodiment will be described. Next, referring to FIG. 7, a flow of a series of processes by the information processing apparatus 100 will be described.

Figure 8:
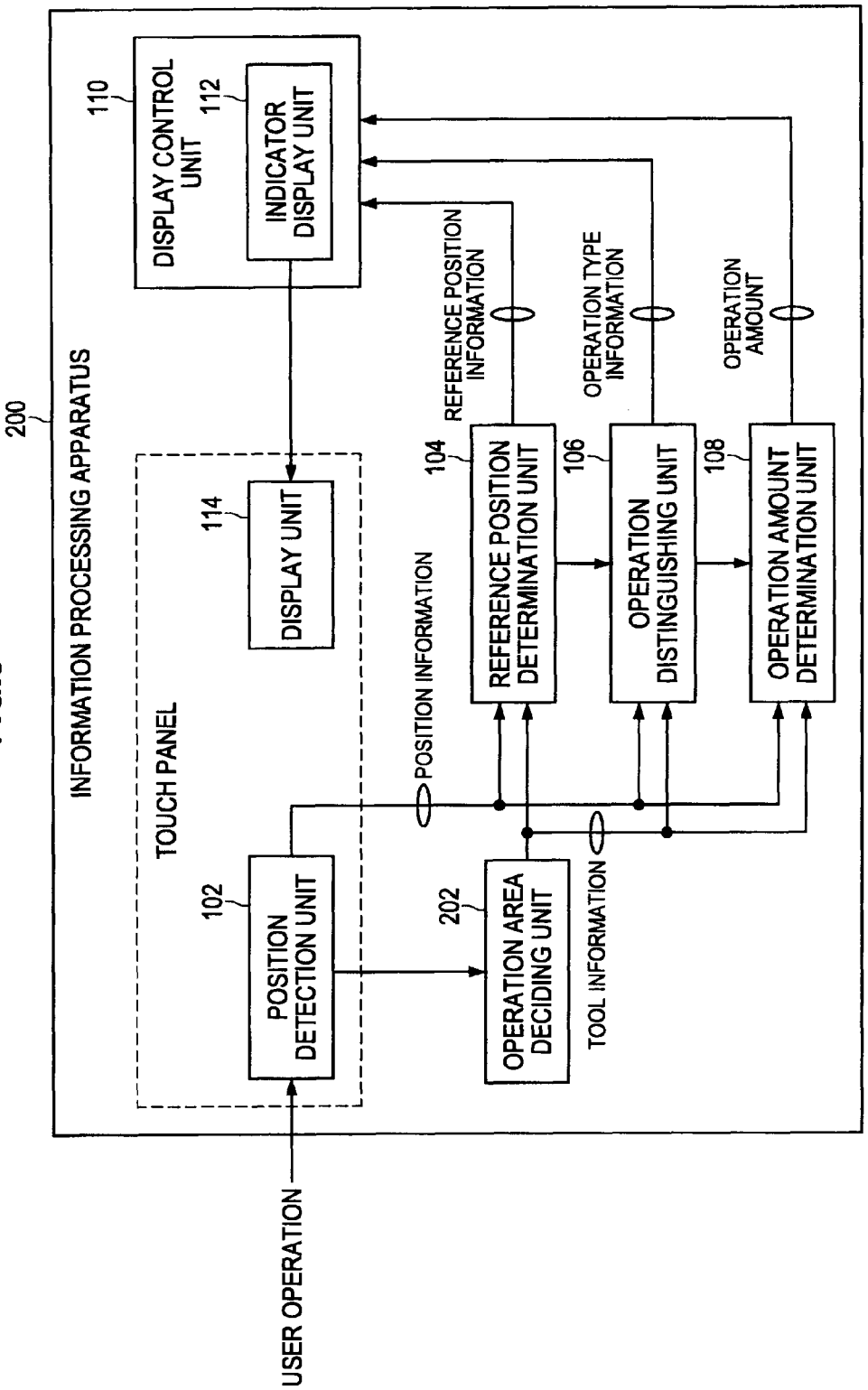
FIG. 8 is an explanatory diagram showing a functional configuration example of an information processing apparatus according to a modified example (modified example 1) of the present embodiment.

Then, referring to FIG. 8, a functional configuration of the information processing apparatus 200 according to a modified example (modified example 1) of the present embodiment will be described in detail. At the same time, referring to FIG. 9, an operation input method and a display control method according to the present embodiment will be described. Next, referring to FIG. 10, a flow of a series of processes by the information processing apparatus 200 will be described.

Figure 11:
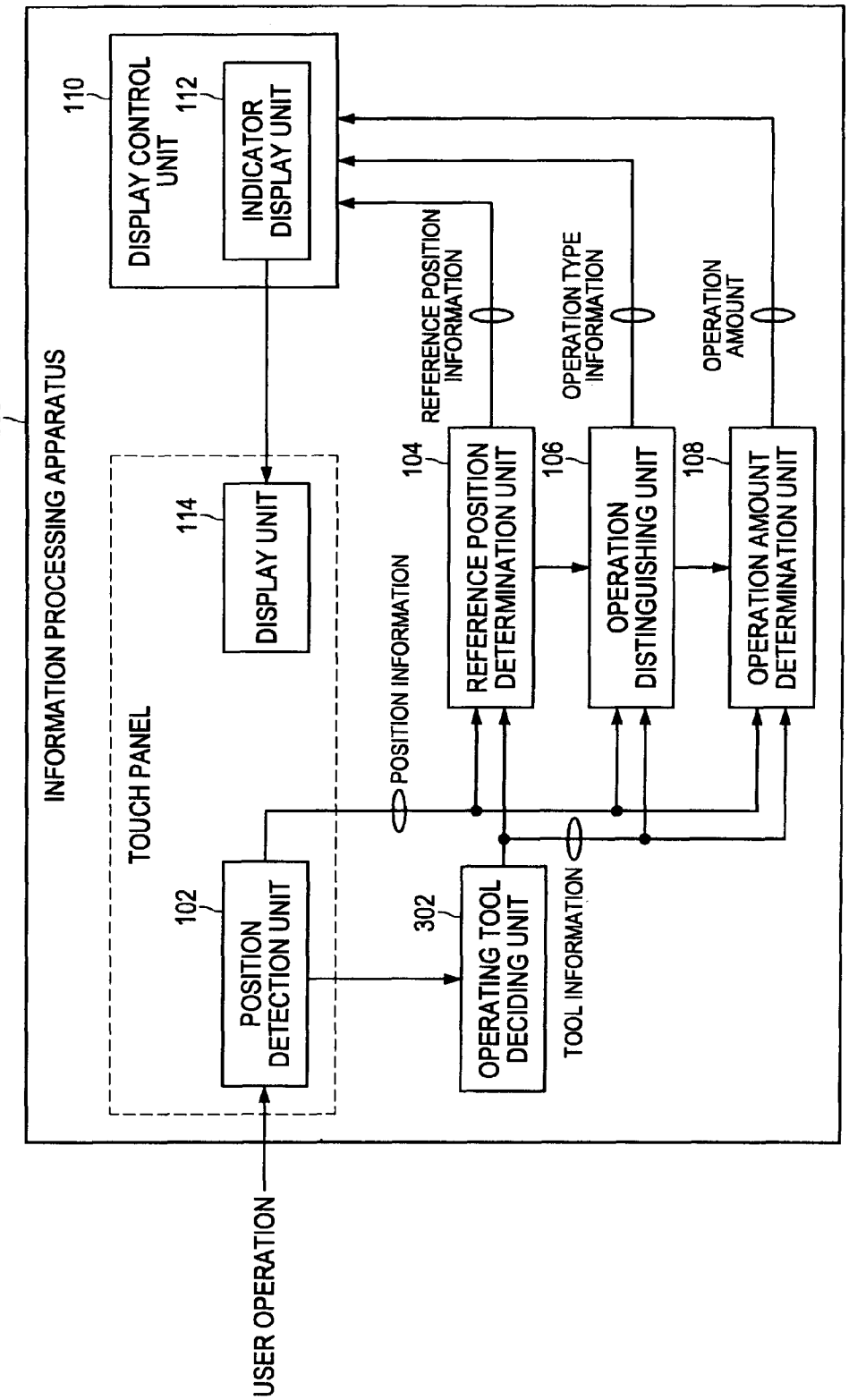
FIG. 11 is an explanatory diagram showing a functional configuration example of an information processing apparatus according to a modified example (modified example 2) of the present embodiment.

Then, referring to FIG. 11, a functional configuration of the information processing apparatus 300 according to a modified example (modified example 2) of the present embodiment will be described. Then, referring to FIG. 12, a flow of a series of processes by the information processing apparatus 300 will be described. Next, referring to FIG. 13, a hardware configuration of the information processing apparatuses 100, 200 and 300 will be described. Lastly, a technical idea of the present embodiment and effects obtained from the technical idea will be briefly described.

(Explanation Items)
1: Enlargement Operation Method in General
2: Embodiment
  2-1: Summary of Architecture
  2-2: Configuration of Information Processing Apparatus 100
    2-2-1: Functional Configuration
    2-2-2: Process Flow
  2-3: (Modified Example 1) Configuration of Information Processing Apparatus 200
    2-3-1: Functional Configuration
    2-3-2: Process Flow
  2-4: (Modified Example 2) Configuration of Information Processing Apparatus 300
    2-4-1: Functional Configuration
    2-4-2: Process Flow
  2-5: Hardware Configuration
3: Conclusion

1: ENLARGEMENT OPERATION METHOD IN GENERAL

First, before giving a detailed description of an embodiment of the present embodiment, an enlargement operation method of a general information processing apparatus 10 will be briefly described with reference to FIGS. 1 and 2. FIG. 1 is an explanatory diagram showing an example of an enlargement operation method for a map application. On the other hand, FIG. 2 is an explanatory diagram showing an example of the enlargement operation method of the information processing apparatus 10 mounted with a touch panel 12.

First, reference will be made to FIG. 1. For example, a car navigation system, a portable information terminal, or the like, is in many cases mounted with a map application for displaying a current location of a user or for displaying a map of a region desired by the user. In case of using such map application, the user checks the location of himself/herself or checks a building or the like at a destination by changing the scale of the map. Thus, an enlargement/reduction operation is frequently performed. In many map applications, an operation object for performing the enlargement/reduction operation is provided on a screen. The user performs the enlargement/reduction operation by operating the operation object provided on the screen or performs the enlargement/reduction operation by using an operating tool such as a wheel mouse.

Here, an operation of a map application is described as a typical example. However, the same can be said for an operation of enlarging/reducing the display of a website being viewed using a web browser or an operation of enlarging/reducing a photograph displayed on a screen. For example, let us consider an operation of enlarging/reducing an image displayed on the touch panel 12 of the information processing apparatus 10 as shown in FIG. 2. The information processing apparatus 10 shown in FIG. 2 is mounted with the touch panel 12 having both a function of an output (display) device and a function of an input device. Thus, a user can input information by tapping or dragging the touch panel 12 with a finger 14. Moreover, the finger 14 is an example of an operating tool. Also, expressions, fingers 14A and 14B, may be used to distinguish between two fingers.

The information processing apparatus 10 illustrated in FIG. 2 enlarges an image displayed on the touch panel 12 in case a user touches the touch panel 12 with two fingers 14A and 14B and performs a movement of separating the two fingers 14A and 14B that were pressed together. That is, when the finger 14A is moved in an operation direction (A) and the finger 14B is moved in an operation direction (B), the image displayed on the touch panel 12 is enlarged. On the contrary, the information processing apparatus 10 reduces the image displayed on the touch panel 12 in case the user touches the touch panel 12 with the two fingers 14A and 14B and performs a movement of bringing together the two fingers 14A and 14B that were set apart. As described, since the enlargement/reduction operation of an image is realized based on the separating and bringing together of the two fingers 14A and 14B, a user can intuitively perform the enlargement/reduction operation of an image.

However, as shown in FIG. 2, in case of performing the enlargement/reduction operation by using the two fingers 14A and 14B, since the two fingers 14A and 14B are moved at the same time, it is difficult to subtly adjust the magnification rate, which is determined by the distance between the fingers 14A and 14B. Also, since the two fingers 14A and 14B are being moved, it is hard for a user to know the position that is a reference for the enlargement/reduction. Although the enlargement/reduction operation is given as an example here, the same problem arises for a case of performing a rotation operation or the like of an image. The technology according to the embodiment described below is to provide solutions to such issues.

2: EMBODIMENT

An embodiment of the present invention will be described. The present embodiment relates to operation methods for enlarging, reducing or rotating a display object such as an image by using a plurality of operating tools. Particularly, the present embodiment proposes an operating system capable of specifying with ease a position to be a reference for the enlargement, reduction, rotation, or the like, without increasing the operation processes. In the following, a technology capable of realizing such operating system will be described in detail.

2-1: Summary of Architecture

First, referring to FIG. 3, a summary of architecture relating to means (corresponding to the information processing apparatuses 100, 200 and 300 described later) for realizing the technology according to the present embodiment will be described. Moreover, here, the means will simply be called a system.

As shown in FIG. 3, the above-described system includes an input device Q10, a gesture processing unit Q12, an application Q14, and an output device Q16. The input device Q10 is means for detecting a position touched by an operating tool such as a finger or a stylus pen. The function of the input device Q10 is realized by a touch panel or a touchpad, for example. Information on the touch position (hereinafter, "a touch position") input via the input device Q10 is input to the gesture processing unit Q12. Also, in case a user drags the operating tool, information on a movement track (hereinafter, "a movement track") of the operating tool is input to the gesture processing unit Q12.

The gesture processing unit Q12 decides the type of a process associated with the touch position or the movement track input via the input device Q10. For example, in case the position of a button displayed on a screen and the touch position coincide, the gesture processing unit Q12 specifies a specific process associated with the button. Also, in case the movement track and a specific gesture shape coincide, the gesture processing unit Q12 specifies a process associated with the gesture. The type of the process specified by the gesture processing unit Q12 in this manner is notified to the application Q14.

The application Q14 is means for executing the process of the type specified by the gesture processing unit Q12. Accordingly, when the type of the process is notified by the gesture processing unit Q12, the application Q14 executes the process of the notified type. For example, when an enlargement process of an image is specified by the gesture processing unit Q12, the application Q14 executes the enlargement process of the image based on the notification information received from the gesture processing unit Q12. Then, data of the image subjected to the enlargement process by the application Q14 is input to the output device Q16.

The output device Q16 is a touch panel or a display, for example. Accordingly, the enlarged image input from the application Q14 is displayed on the output device Q16 and is presented to the user. Moreover, in case the input device Q10 and the output device Q16 are both a touch panel, the input device Q10 and the output device Q16 are preferably integrally formed. With the configuration and the flow of processes as described above, a change operation of a display setup is executed and the operating system using a touch panel or the like is realized. However, the explanation is given here only on the summary of the architecture, and the function of each structural element should be refined to realize a distinctive operating system according to the present embodiment. Such will be described in detail in the following.

2-2: Configuration of Information Processing Apparatus 100

Here, an explanation will be given on a configuration of the information processing apparatus 100 capable of realizing the distinctive operating system according to the present embodiment. First, referring to FIG. 4, a functional configuration of the information processing apparatus 100 according to the present embodiment will be described. At the same time, referring to FIGS. 5 and 6, an explanation will be given on a concrete example of the distinctive operating system according to the present embodiment. Then, referring to FIG. 7, an overall flow of processes by the information processing apparatus 100 will be described.

(2-2-1: Functional Configuration)

First, reference will be made to FIG. 4. As shown in FIG. 4, the information processing apparatus 100 includes a position detection unit 102, a reference position determination unit 104, an operation distinguishing unit 106, an operation amount determination unit 108, a display control unit 110, and a display unit 114. Also, the display control unit 110 is provided with an indicator display unit 112. Furthermore, the position detection unit 102 and the display unit 114 form a touch panel. The touch panel corresponds to the input device Q10 and the output device Q16 described above. Also, other structural elements correspond to the gesture processing unit Q12 and the application Q14 described above.

Moreover, the operation distinguishing unit 106 described above is an example of a display change operation specifying unit. Also, the indicator display unit 112 is an example of a reference indicator display unit and a change indicator display unit.

(Position Detection Unit 102)

First, when an operation is performed by a user, the position detection unit 102 detects the position of an operating tool. The operation here is the act of bringing the operating tool such as a finger or a stylus pen into proximity of the touch panel or making the operating tool contact the touch panel, or the act of moving the touch position. Moreover, the present embodiment is premised on that the operation is performed by using a plurality of operating tools. Accordingly, even if a plurality of operating tools are used to perform an operation, the position detection unit 102 can detect the position of each operating tool. Information indicating the position of each operating tool (hereinafter, "position information") detected by the position detection unit 102 is input to the reference position determination unit 104, the operation distinguishing unit 106 and the operation amount determination unit 108.

(Reference Position Determination Unit 104)

As described above, the reference position determination unit 104 is input with the position information from the position detection unit 102. When the position information is input from the position detection unit 102, the reference position determination unit 104 determines a position on the screen which is to be a reference at the time of executing a specific process (hereinafter, "a reference position"). In the following, for the sake of explanation, the enlargement process of an image will be mentioned as an example of the specific process and an explanation will be given with reference to the example. In this case, the reference position determination unit 104 determines a position on the screen which is to be the centre of enlargement based on the position information input from the position detection unit 102. For example, the reference position determination unit 104 determines the position of an operating tool that touched first in a user operation (hereinafter, "a first operating tool) as the reference position. Information on the reference position (hereinafter, "reference position information") determined by the reference position determination unit 104 is input to the operation distinguishing unit 106 and the display control unit 110.

(Operation Distinguishing Unit 106)

As described above, the operation distinguishing unit 106 is input with the position information from the position detection unit 102 and the reference position information from the reference position determination unit 104. When the position information and the reference position information are input, the operation distinguishing unit 106 distinguishes position information of an operating tool different from the above-described first operating tool (hereinafter, "a second operating tool") by using the reference position information, and specifies the moving direction of the second operating tool based on the position information. At this time, information used for distinguishing the position information of the second operating tool is input to the operation amount determination unit 108.

The operation distinguishing unit 106 holds a table in which moving manners of the second operating tool and specific processes are associated, and specifies, based on a moving direction of the second operating tool specified by the position information, a specific process corresponding to the moving direction. Then, information indicating the type of a process (hereinafter, "an operation type") specified by the operation distinguishing unit 106 (hereinafter, "operation type information") is input to the display control unit 110. For example, in case the moving direction of the second operating tool based on the position information input from the position detection unit 102 corresponds to the enlargement process, the operation distinguishing unit 106 determines the operation type to be the enlargement process of an image and inputs the operation type information indicating the enlargement process of the image to the display control unit 110.

(Operation Amount Determination Unit 108)

As described above, the operation amount determination unit 108 is input with the position information by the position detection unit 102. Also, the operation amount determination unit 108 is input with information for distinguishing the position information of the second operating tool, from the operation distinguishing unit 106. Thus, the operation amount determination unit 108 distinguishes the position information of the second operating tool based on the information input from the operation distinguishing unit 106 and computes an operation amount according to a moving amount of the second operating tool. For example, when the operation type is the enlargement process of an image, the operation amount here will be a magnification rate. Moreover, the relationship between the moving amount and the operation amount can be freely set by the user. Furthermore, the operation amount determined by the operation amount determination unit 108 is input to the display control unit 110.

(Display Control Unit 110, Display Unit 114)

As described above, the display control unit 110 is input with the reference position information from the reference position determination unit 104, the operation type information from the operation distinguishing unit 106, and the operation amount from the operation amount determination unit 108. Thus, the display control unit 110 takes the reference position indicated by the reference position information as a reference, and executes, by the operation amount, a process of an operation type indicated by the operation type information. For example, in case the operation type is the enlargement process of an image, the display control unit 110 sets the reference position indicated by the reference position information as the centre of enlargement, and enlarges and displays the image on the display unit 114 with the magnification rate that is indicated by the operation amount. As a result, the image is enlarged by the magnification rate according to the moving amount of the second operating tool with the position specified by the user by the first operating tool as the reference, and is displayed on the display unit 114.

Concrete Example

Figure 5:
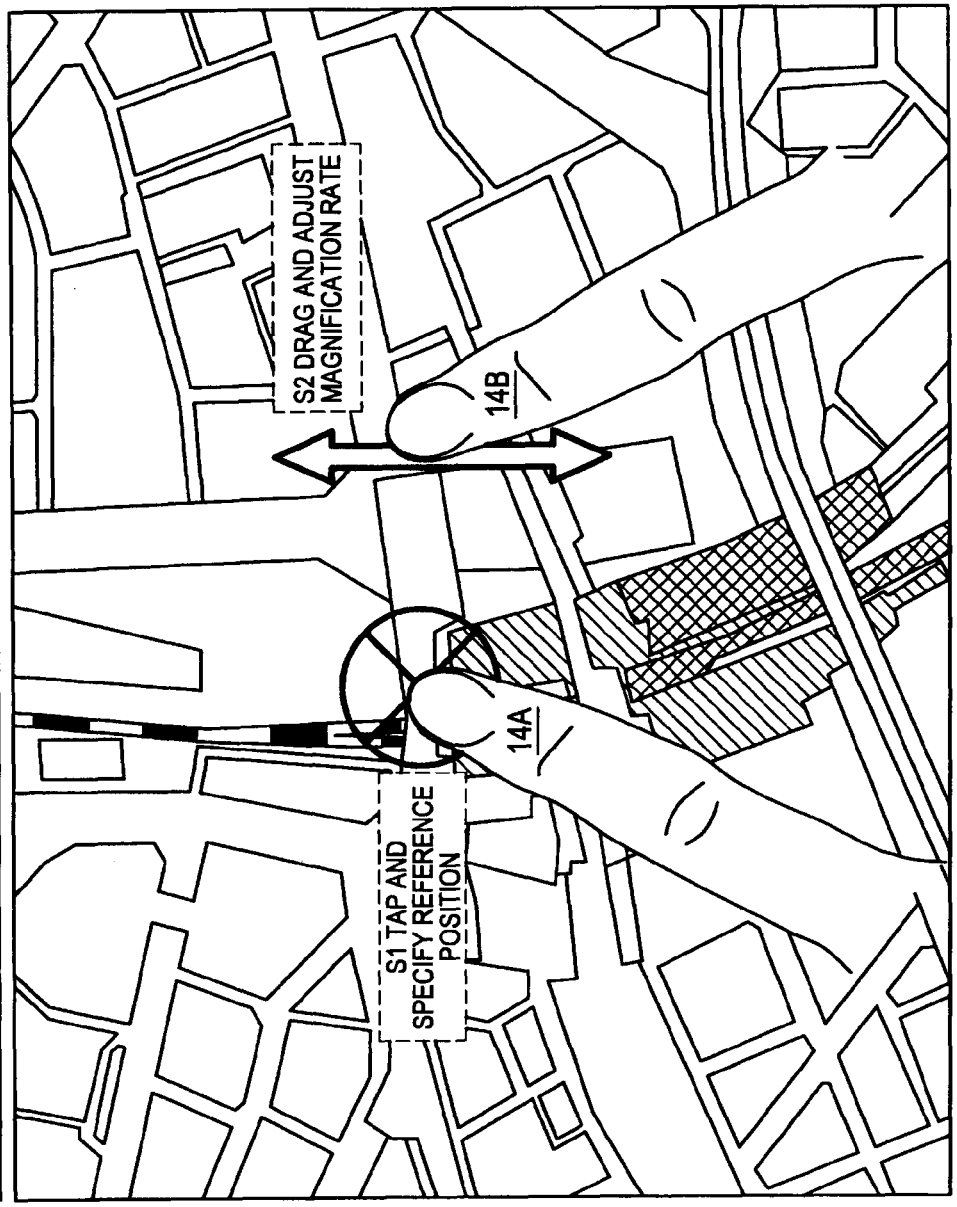
FIG. 5 is an explanatory diagram showing an example of an enlargement operation method according to the present embodiment.

Here, with reference to FIG. 5, a concrete example of the operating system realized by the above-described information processing apparatus 100 will be described. FIG. 5 shows a touch panel on which a map image is displayed and the fingers 14A and 14B, which are examples of the operating tool. The finger 14A is the first to touch the touch panel, and the finger 14B touches the touch panel after the finger 14A. Here, a series of processes executed by the above-described information processing apparatus 100 at the time of the enlargement operation of the map image displayed on the touch panel will be concretely described. Incidentally, the user operation itself is configured from a step of specifying the reference position by a tapping operation by the finger 14A (S1), and a step of adjusting the magnification rate by a dragging operation by the finger 14B (S2).

First, when the finger 14A taps, the position of the finger 14A is detected by the position detection unit 102. The position information of the finger 14A detected by the position detection unit 102 is input to the reference position determination unit 104, the operation distinguishing unit 106 and the operation amount determination unit 108. Incidentally, the finger 14A is what is detected first in the user operation (first operating tool). Thus, the position information of the finger 14A detected by the position detection unit 102 is used by the reference position determination unit 104. As described above, the reference position determination unit 104 determines the tap position of the finger 14A as the reference position, and inputs the reference position information indicating the reference position to the display control unit 110.

Then, when the finger 14B is dragged, the position of the finger 14B is detected by the position detection unit 102. Here, the positions are detected in time series by the position detection unit 102. That is, a movement stroke is actually detected by the position detection unit 102. Then, the position information of the finger 14B detected by the position detection unit 102 is input to the reference position determination unit 104, the operation distinguishing unit 106 and the operation amount determination unit 108. Incidentally, the finger 14B is what is detected after the finger 14A (second operating tool). Thus, the position information of the finger 14B detected by the position detection unit 102 is used by the operation distinguishing unit 106 and the operation amount determination unit 108.

As described above, the operation distinguishing unit 106 specifies the moving direction of the dragged finger 14B, and selects a specific process (enlargement process of map image) corresponding to the moving direction. For example, as shown in FIG. 5, the enlargement process of the image is associated with the dragging operation in the vertical direction. In this case, the operation distinguishing unit 106 detects a movement in the vertical direction from the position information of the finger 14B, and inputs the operation type information indicating the enlargement process of the image to the display control unit 110. On the other hand, the operation amount determination unit 108 computes the distance between the position touched by the finger 14B and the position after the movement, and determines the magnification rate for the image according to the computed moving amount. Then, the operation amount determination unit 108 inputs the determined magnification rate for the image to the display control unit 110 as the operation amount.

As described above, the display control unit 110 is input with the reference position information indicating the touch position of the finger 14A, the operation type information indicating the enlargement process specified according to the moving direction of the finger 14B, and the operation amount determined according to the moving distance of the finger 14B. Thus, the display control unit 110 sets the reference position indicated by the reference position information as the centre of enlargement, and enlarges the map image displayed on the display unit 114 by the magnification rate indicated by the operation amount. With this configuration, a user is enabled to specify a reference position in a series of enlargement operations, and at the same time, to subtly adjust the magnification rate with ease. As a result, the operability is significantly improved.

(Indicator Display Unit 112)

Figure 6:
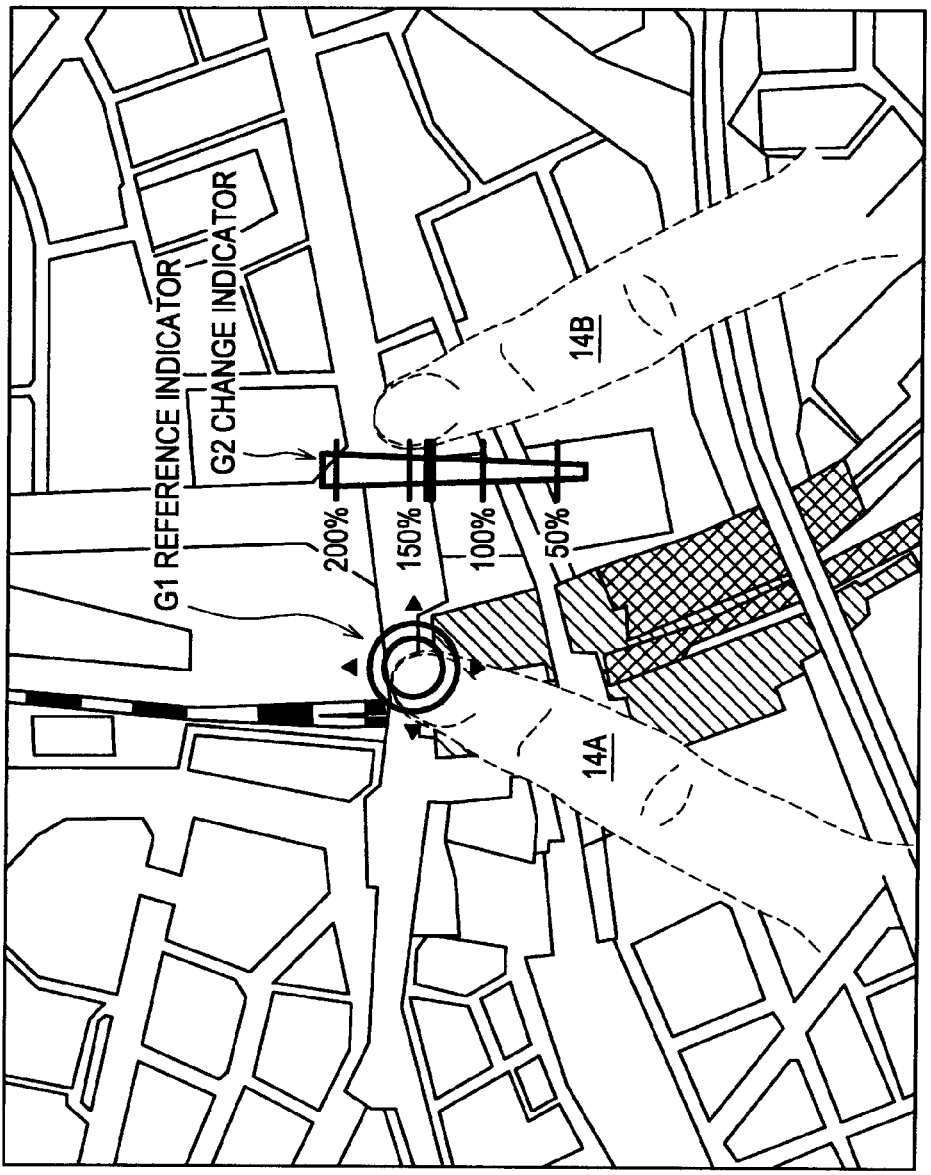
FIG. 6 is an explanatory diagram showing an example of the enlargement operation method according to the present embodiment, and a method for displaying a supplementary display object for the enlargement operation.

In FIG. 5, supplementary marks (a circle with x inside, and a double-pointed arrow) are shown, for the sake of explanation, to clearly indicate the tap position of the finger 14A and the moving direction of the finger 14B. However, these supplementary marks may actually be displayed by the display control unit 110. For example, as shown in FIG. 6, with a reference indicator G1 indicating the reference position and a change indicator G2 indicating the operation amount displayed on the display unit 114, a user can easily perceive the reference position and the operation amount. Display control of the reference indicator G1 and the change indicator G2 is performed by the indicator display unit 112 (refer to FIG. 4) provided in the display control unit 110.

For example, when a touch position of the finger 14A is determined by the reference position determination unit 104 to be the reference position, the indicator display unit 112 makes the display unit 114 display the reference indicator G1. Also, when the finger 14B touches the touch panel, the indicator display unit 112 makes the display unit 114 display the change indicator G2. For example, the indicator display unit 112 displays, as the change indicator G2, a slide bar object indicating the magnitude of the operation amount, and changes the position of a slider according to the movement of the finger 14B. Furthermore, the indicator display unit 112 displays the magnification rate on a specific position on the bar. With this configuration, a user is enabled to accurately specify a desired magnification rate with simple operation.

Heretofore, the functional configuration of the information processing apparatus 100 has been described in detail.

(2-2-2: Process Flow)

Figure 7:
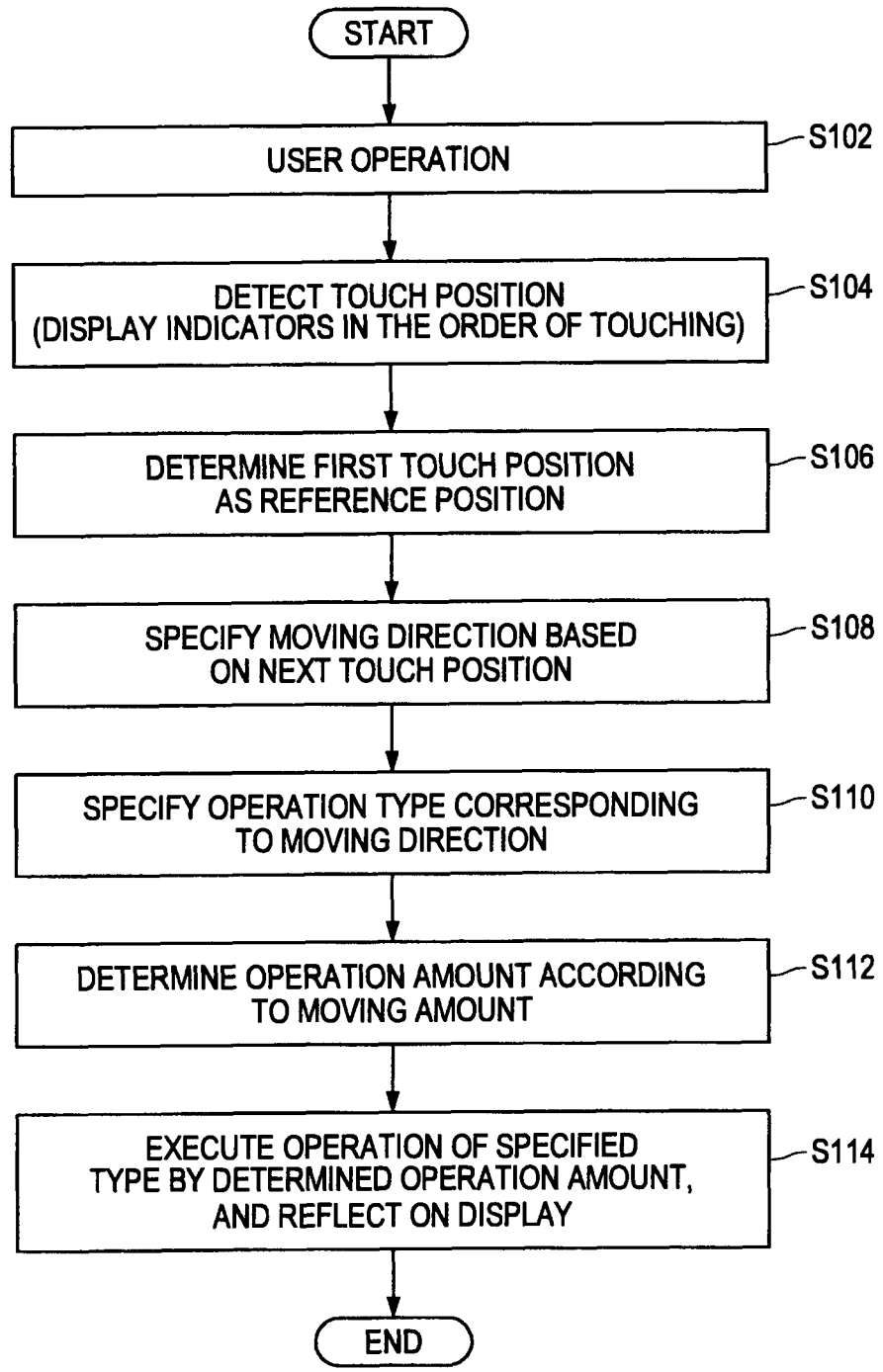
FIG. 7 is an explanatory diagram showing an overall flow of a display control method according to the present embodiment.

Next, with reference to FIG. 7, an overall flow of processes by the information processing apparatus 100 will be described. FIG. 7 is an explanatory diagram showing an overall flow of processes by the information processing apparatus 100.

As shown in FIG. 7, when a user operation is performed (S102), a touch position is detected by the position detection unit 102 (S104). At this time, some kind of indicator may be displayed by the indicator display unit 112 to clearly indicate the touch position. Also, in case of a plurality of operating tools touching the touch panel, the touch position of each operating tool is detected by the position detection unit 102 and is input to the reference position determination unit 104, the operation distinguishing unit 106 and the operation amount determination unit 108.

Next, the touch position of an operating tool that touched the touch panel first (first operating tool) is determined by the reference position determination unit 104 to be the reference position (S106). Then, reference position information indicating the reference position is input from the reference position determination unit 104 to the display control unit 110.

Next, a moving direction is specified by the operation distinguishing unit 106 based on the touch position of an operating tool that touched the touch panel next (second operating tool) (S108). Furthermore, an operation type corresponding to the specified moving direction is distinguished by the operation distinguishing unit 106 (S110). Then, operation type information indicating the operation type is input from the operation distinguishing unit 106 to the display control unit 110.

Next, an operation amount according to the moving amount of the second operating tool is determined by the operation amount determination unit 108 (S112). Then, information on the determined operation amount is input from the operation amount determination unit 108 to the display control unit 110. Next, an operation of the operation type indicated by the operation type information is performed by the display control unit 110 by the amount of the input operation amount with the reference position indicated by the reference position information as the reference, and the operation is reflected on the display on the display unit 114 (S114). As described, since a reference position can be specified by the first operating tool and an operation type and a moving amount can be specified according to the movement of the second operating tool, a display operation based on a reference position is realized by a series of seamless operations.

Heretofore, an overall flow of processes by the information processing apparatus 100 has been described.

As described above, by applying the technology according to the present embodiment, it becomes possible to specify a reference position or an operation amount (change amount) in a series of seamless operations at the time of performing display change, such as an enlargement/reduction operation or a rotation operation, based on a reference position. Also, since a plurality of operating tools do not have to be moved at the same time, the operation amount can be subtly changed with ease. Furthermore, by displaying the reference indicator G1 and the change indicator G2, a user is enabled to easily perceive the operation amount, and also, to easily perceive the operation type specified according to the movement of the second operating tool. As a result, a highly convenient operating system is realized.

2-3: (Modified Example 1)

Configuration of Information Processing Apparatus 200

Next, the configuration of the information processing apparatus 200 according to a modified example (modified example 1) of the present embodiment will be described. First, with reference to FIGS. 8 and 9, the functional configuration of the information processing apparatus 200 according to the modified example 1 will be described. Then, with reference to FIG. 10, an overall flow of processes by the information processing apparatus 200 will be described. Incidentally, a detailed description of structural elements substantially the same as those of the above-described information processing apparatus 100 will be omitted.

(2-3-1: Functional Configuration)

First, reference will be made to FIG. 8. As shown in FIG. 8, the information processing apparatus 200 includes the position detection unit 102, the reference position determination unit 104, the operation distinguishing unit 106, the operation amount determination unit 108, the display control unit 110, the display unit 114, and an operation area deciding unit 202. Also, the display control unit 110 is provided with the indicator display unit 112. Furthermore, the position detection unit 102 and the display unit 114 form a touch panel. The touch panel corresponds to the input device Q10 and the output device Q16 described above. Also, other structural elements correspond to the gesture processing unit Q12 and the application Q14 described above.

Moreover, the operation distinguishing unit 106 described above is an example of a display change operation specifying unit. Also, the indicator display unit 112 is an example of a reference indicator display unit and a change indicator display unit.

The main difference to the above-described information processing apparatus 100 is the presence of the operation area deciding unit 202. Also, according to the above-described information processing apparatus 100, among a plurality of operating tools, the operating tool that touched the touch panel first was determined to be the first operating tool, and the operating tool that touched the touch panel next was determined to be the second operating tool. However, in the modified example 1, the determination process for the first and the second operating tools is performed by the operation area deciding unit 202. Thus, the reference position determination unit 104, the operation distinguishing unit 106 and the operation amount determination unit 108 do not perform the determination process for the first and the second operating tools. In the following, the functional configuration of the information processing apparatus 200 will be described, focusing on these differences.

(Position Detection Unit 102)

First, when an operation is performed by a user, the position detection unit 102 detects the position of an operating tool. The operation here means the act of touching the touch panel with an operating tool such as a finger or a stylus pen, or the act of moving the touch position. Moreover, the present embodiment is premised on that the operation is performed by using a plurality of operating tools. Accordingly, even if a plurality of operating tools are used to perform an operation, the position detection unit 102 can detect the position of each operating tool. The position information indicating the position of each operating tool detected by the position detection unit 102 is input to the operation area deciding unit 202, the reference position determination unit 104, the operation distinguishing unit 106 and the operation amount determination unit 108.

(Operation Area Deciding Unit 202)

Figure 9:
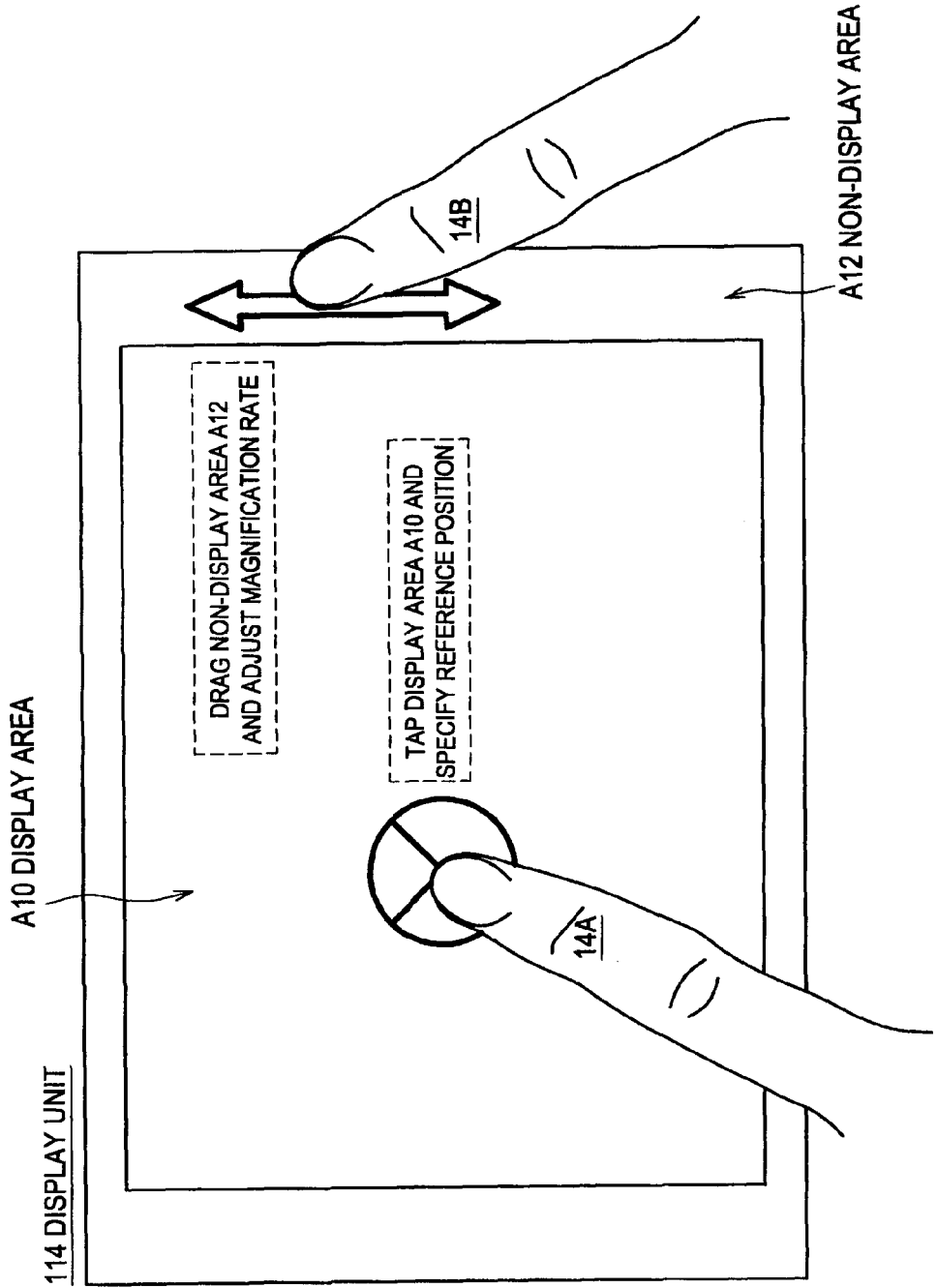
FIG. 9 is an explanatory diagram showing an example of an enlargement operation method according to the modified example (modified example 1) of the present embodiment.

As described above, the operation area deciding unit 202 is input with the position information from the position detection unit 102. When the position information is input from the position detection unit 102, the operation area deciding unit 202 classifies the plurality of operating tools into the first operating tool and the second operating tool based on the position information that is input. Here, a method of distinguishing the first and the second operating tools by the operation area deciding unit 202 will be described with reference to FIG. 9. As shown in FIG. 9, a display area A10 and a non-display area A12 are provided on the display unit 114 of the modified example 1.

In many cases, an outer frame is provided to a display screen on which an image or the like is to be displayed. Thus, a sensor area of the position detection unit 102 can be easily expanded to the area of the outer frame. For example, the sensor area can be expanded to the outer frame portion by separately providing a sensor device such as a press detection sensor or a capacitive sensor to the outer frame or by extending a sensor device provided to the display screen to the outer frame portion. In the modified example 1, a touch panel with the sensor area expanded to the outer frame portion is used. The display area A10 is set in the display screen portion, and the non-display portion A12 is set in the outer frame portion.

The operation area deciding unit 202 decides whether a touch position is included in the display area A10 or the non-display area A12 based on the position information input from the position detection unit 102. Then, when the touch position is included in the display area A10, the operation area deciding unit 202 determines the operating tool that touched to be the first operating tool. Also, when the touch position is included in the non-display area A12, the operation area deciding unit 202 determines the operating tool that touched to be the second operating tool. Then, information on the first and the second operating tools (hereinafter, "tool information") determined by the operation area deciding unit 202 is input to the reference position determination unit 104, the operation distinguishing unit 106 and the operation amount determination unit 108.

(Reference Position Determination Unit 104)

As described above, the reference position determination unit 104 is input with the position information from the position detection unit 102. Also, the reference position determination unit 104 is input with the tool information from the operation area deciding unit 202. When the position information and the tool information are input, the reference position determination unit 104 determines a reference position on the screen which is to be the reference at the time of performing a specific process. For example, the reference position determination unit 104 determines a reference position on the screen which is to be the centre of enlargement based on the position information input from the position detection unit 102. At this time, the reference position determination unit 104 determines the position of the first operating tool as the reference position based on the input tool information. Information on the reference position (reference position information) determined by the reference position determination unit 104 is input to the display control unit 110.

(Operation Distinguishing Unit 106)

As described above, the operation distinguishing unit 106 is input with the position information from the position detection unit 102. Also, the operation distinguishing unit 106 is input with the tool information from the operation area deciding unit 202. When the position information and the tool information are input, the operation distinguishing unit 106 specifies the moving direction of the second operating tool based on the position information and the tool information that are input. For example, the operation distinguishing unit 106 holds a table in which moving manners of the second operating tool and specific processes are associated, and specifies, based on a moving direction of the second operating tool specified by the position information, a specific process corresponding to the moving direction. The operation type information indicating the type of process (operation type) specified by the operation distinguishing unit 106 is input to the display control unit 110.

(Operation Amount Determination Unit 108)

As described above, the operation amount determination unit 108 is input with the position information from the position detection unit 102. Also, the operation amount determination unit 108 is input with the tool information from the operation area deciding unit 202. Thus, the operation amount determination unit 108 distinguishes the position information of the second operating tool based on the tool information, and computes the moving amount of the second operating tool based on the position information. Then, the operation amount determination unit 108 determines the operation amount according to the moving amount of the second operating tool. For example, when the operation type is the enlargement process of an image, the magnification rate is determined by the operation amount determination unit 108.

The operation amount determined by the operation amount determination unit 108 is input to the display control unit 110.

(Display Control Unit 110, Display Unit 114)

As described above, the display control unit 110 is input with the reference position information from the reference position determination unit 104, the operation type information from the operation distinguishing unit 106, and the operation amount from the operation amount determination unit 108. Thus, the display control unit 110 takes the reference position indicated by the reference position information as a reference, and executes, by the operation amount, a process of an operation type indicated by the operation type information. For example, in case the operation type is the enlargement process of an image, the display control unit 110 sets the reference position indicated by the reference position information as the centre of enlargement, and enlarges and displays the image on the display unit 114 with the magnification rate that is indicated by the operation amount. As a result, the image is enlarged by the magnification rate according to the moving amount of the second operating tool with the position specified by the user by the first operating tool as the reference, and is displayed on the display unit 114.

Heretofore, the functional configuration of the information processing apparatus 200 has been described in detail.

(2-3-2: Process Flow)

Figure 10:
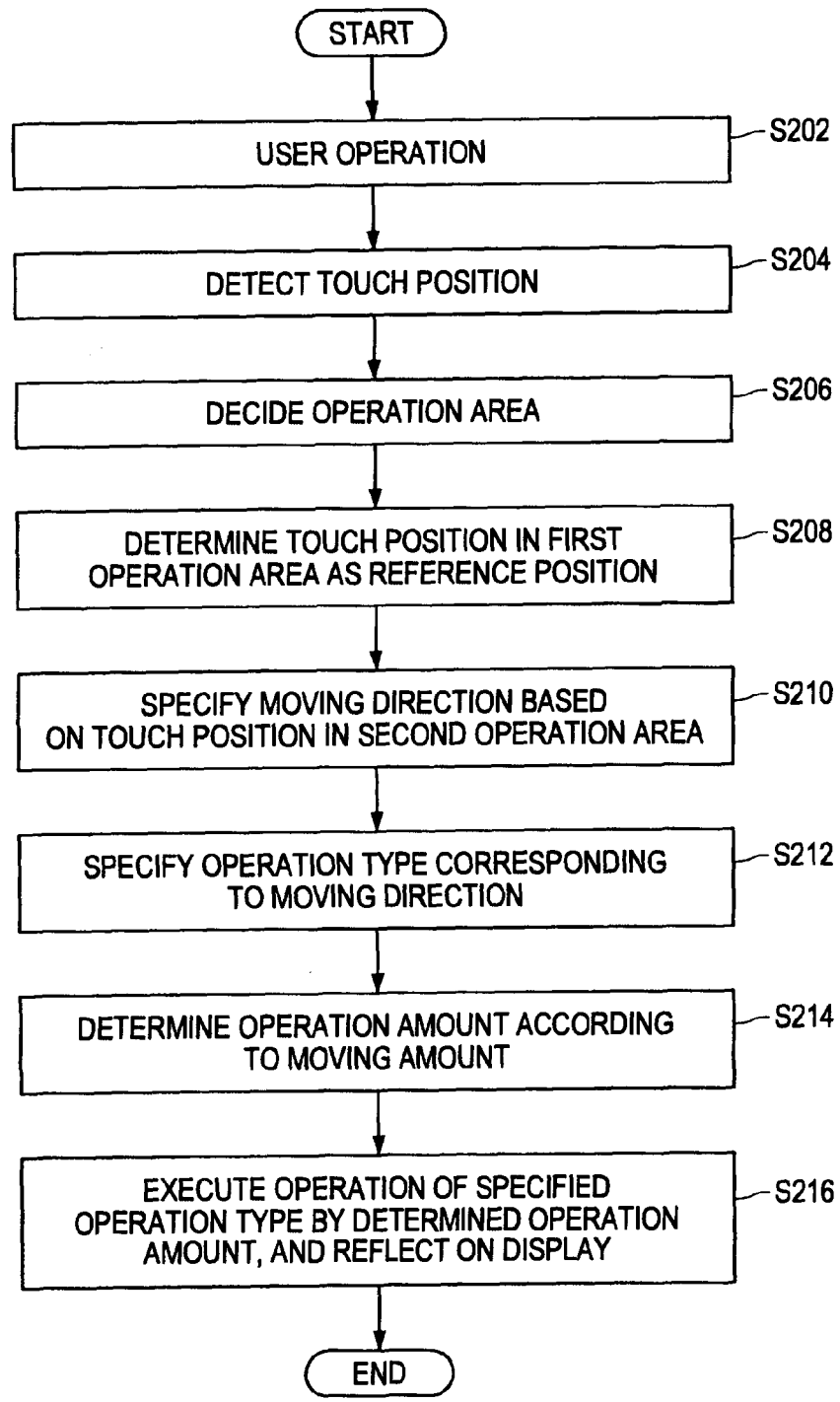
FIG. 10 is an explanatory diagram showing an overall flow of a display control method according to the modified example (modified example 1) of the present embodiment.

Next, with reference to FIG. 10, an overall flow of processes by the information processing apparatus 200 will be described. FIG. 10 is an explanatory diagram showing an overall flow of processes by the information processing apparatus 200.

As shown in FIG. 10, when a user operation is performed (S202), a touch position is detected by the position detection unit 102 (S204). At this time, some kind of indicator may be displayed by the indicator display unit 112 to clearly indicate the touch position. Also, in case of a plurality of operating tools touching the touch panel, the touch position of each operating tool is detected by the position detection unit 102 and is input to the operation area deciding unit 202, the reference position determination unit 104, the operation distinguishing unit 106 and the operation amount determination unit 108.

Next, the operating tool that touched the display area A10 is determined by the operation area deciding unit 202 to be the first operating tool, and the operating tool that touched the non-display area A12 is determined to be the second operating tool (S206). Then, information for specifying the first and the second operating tools (tool information) is input to the reference position determination unit 104, the operation distinguishing unit 106 and the operation amount determination unit 108.

Next, the touch position of the first operating tool is determined by the reference position determination unit 104 to be the reference position (S208). Then, reference position information indicating the reference position is input from the reference position determination unit 104 to the display control unit 110. Next, a moving direction is specified by the operation distinguishing unit 106 based on the touch position of the second operating tool (S210). Furthermore, an operation type corresponding to the specified moving direction is distinguished by the operation distinguishing unit 106 (S212). Then, operation type information indicating the operation type is input from the operation distinguishing unit 106 to the display control unit 110.

Next, an operation amount according to the moving amount of the second operating tool is determined by the operation amount determination unit 108 (S214). Then, information on the determined operation amount is input from the operation amount determination unit 108 to the display control unit 110. Next, an operation of the operation type indicated by the operation type information is performed by the display control unit 110 by the amount of the input operation amount with the reference position indicated by the reference position information as the reference, and the operation is reflected on the display on the display unit 114 (S216). As described, since a reference position can be specified by the first operating tool and an operation type and a moving amount can be specified according to the movement of the second operating tool, a display operation based on a reference position is realized by a series of seamless operations.

Heretofore, an overall flow of processes by the information processing apparatus 200 has been described.

As described above, by applying the technology according to the modified example 1, it becomes possible to specify a reference position or an operation amount (change amount) in a series of seamless operations at the time of performing display change, such as an enlargement/reduction operation or a rotation operation, based on a reference position. Also, since the specifying operation for the reference position and the specifying operation for the operation amount are separated based on the operation areas, a user is enabled to perform operation without worrying about the order of touching by the operating tools. As a result, a highly convenient operating system is realized.

2-4: (Modified Example 2)

Configuration of Information Processing Apparatus 300

Next, the configuration of the information processing apparatus 300 according to a modified example (modified example 2) of the present embodiment will be described. First, with reference to FIG. 11, the functional configuration of the information processing apparatus 300 according to the modified example 2 will be described. Then, with reference to FIG. 12, an overall flow of processes by the information processing apparatus 300 will be described. Incidentally, a detailed description of structural elements substantially the same as those of the above-described information processing apparatus 100 will be omitted.

(2-4-1: Functional Configuration)

First, reference will be made to FIG. 11. As shown in FIG. 11, the information processing apparatus 300 includes the position detection unit 102, the reference position determination unit 104, the operation distinguishing unit 106, the operation amount determination unit 108, the display control unit 110, the display unit 114, and an operating tool deciding unit 302. Also, the display control unit 110 is provided with the indicator display unit 112. Furthermore, the position detection unit 102 and the display unit 114 form a touch panel. The touch panel corresponds to the input device Q10 and the output device Q16 described above. Also, other structural elements correspond to the gesture processing unit Q12 and the application Q14 described above.

Moreover, the operation distinguishing unit 106 described above is an example of a display change operation specifying unit. Also, the indicator display unit 112 is an example of a reference indicator display unit and a change indicator display unit. Furthermore, the position detection unit 102 and the operating tool deciding unit 302 described above are examples of a type detection unit.

The main difference to the above-described information processing apparatus 100 is the presence of the operating tool deciding unit 302. Also, according to the above-described information processing apparatus 100, among a plurality of operating tools, the operating tool that touched the touch panel first was determined to be the first operating tool, and the operating tool that touched the touch panel next was determined to be the second operating tool. However, in the modified example 2, the determination process for the first and the second operating tools is performed by the operating tool deciding unit 302. Thus, the reference position determination unit 104, the operation distinguishing unit 106 and the operation amount determination unit 108 do not perform the determination process for the first and the second operating tools. In the following, the functional configuration of the information processing apparatus 300 will be described, focusing on these differences.

(Position Detection Unit 102)

First, when an operation is performed by a user, the position detection unit 102 detects the position of an operating tool. The operation here means the act of touching the touch panel with an operating tool such as a finger or a stylus pen, or the act of moving the touch position. Moreover, the present embodiment is premised on that the operation is performed by using a plurality of operating tools. Accordingly, even if a plurality of operating tools are used to perform an operation, the position detection unit 102 can detect the position of each operating tool. The position information of each operating tool detected by the position detection unit 102 is input to the reference position determination unit 104, the operation distinguishing unit 106 and the operation amount determination unit 108.

Furthermore, the position detection unit 102 inputs to the operating tool deciding unit 302 information for deciding the type of the operating tool that touched (hereinafter, "tool distinguishing information"). The type of the operating tool may be a finger or a stylus pen, for example. Furthermore, a stylus pen may be provided with a conductive material at the tip or the entire stylus may be formed from a conductive material, for example. By detecting the electromagnetic characteristics or the difference in the pressing power due to the shape or the like, the type of the operating tool can be decided based on the detection result. The tool distinguishing information includes the detection result as described. Moreover, any method can be used for the type deciding method for the operating tool according to the modified example 2.

(Operating Tool Deciding Unit 302)

As described above, the operating tool deciding unit 302 is input with the tool distinguishing information from the position detection unit 102. When the tool distinguishing information is input from the position detection unit 102, the operating tool deciding unit 302 classifies the plurality of operating tools into the first operating tool and the second operating tool based on the tool distinguishing information that is input. For example, the operating tool deciding unit 302 determines a finger to be the first operating tool and a stylus pen to be the second operating tool. Then, information on the first and the second operating tools (hereinafter, "tool information") determined by the operating tool deciding unit 302 is input to the reference position determination unit 104, the operation distinguishing unit 106 and the operation amount determination unit 108.

(Reference Position Determination Unit 104)

As described above, the reference position determination unit 104 is input with the position information from the position detection unit 102. Also, the reference position determination unit 104 is input with the tool information from the operating tool deciding unit 302. When the position information and the tool information are input, the reference position determination unit 104 determines a reference position on the screen which is to be the reference at the time of performing a specific process. For example, the reference position determination unit 104 determines a reference position on the screen which is to be the centre of enlargement based on the position information input from the position detection unit 102. At this time, the reference position determination unit 104 determines the position of the first operating tool as the reference position based on the input tool information. Information on the reference position (reference position information) determined by the reference position determination unit 104 is input to the display control unit 110.

(Operation Distinguishing Unit 106)

As described above, the operation distinguishing unit 106 is input with the position information from the position detection unit 102. Also, the operation distinguishing unit 106 is input with the tool information from the operating tool deciding unit 302. When the position information and the tool information are input, the operation distinguishing unit 106 specifies the moving direction of the second operating tool based on the position information and the tool information that are input. For example, the operation distinguishing unit 106 holds a table in which moving manners of the second operating tool and specific processes are associated, and specifies, based on a moving direction of the second operating tool specified by the position information, a specific process corresponding to the moving direction. The operation type information indicating the type of process (operation type) specified by the operation distinguishing unit 106 is input to the display control unit 110.

(Operation Amount Determination Unit 108)

As described above, the operation amount determination unit 108 is input with the position information from the position detection unit 102. Also, the operation amount determination unit 108 is input with the tool information from the operating tool deciding unit 302. Thus, the operation amount determination unit 108 distinguishes the position information of the second operating tool based on the tool information, and computes the moving amount of the second operating tool based on the position information. Then, the operation amount determination unit 108 determines the operation amount according to the moving amount of the second operating tool. For example, when the operation type is the enlargement process of an image, the magnification rate is determined by the operation amount determination unit 108. The operation amount determined by the operation amount determination unit 108 is input to the display control unit 110.

(Display Control Unit 110, Display Unit 114)

As described above, the display control unit 110 is input with the reference position information from the reference position determination unit 104, the operation type information from the operation distinguishing unit 106, and the operation amount from the operation amount determination unit 108. Thus, the display control unit 110 takes the reference position indicated by the reference position information as a reference, and executes, by the operation amount, a process of an operation type indicated by the operation type information. For example, in case the operation type is the enlargement process of an image, the display control unit 110 sets the reference position indicated by the reference position information as the centre of enlargement, and enlarges and displays the image on the display unit 114 with the magnification rate that is indicated by the operation amount. As a result, the image is enlarged by the magnification rate according to the moving amount of the second operating tool with the position specified by the user by the first operating tool as the reference, and is displayed on the display unit 114.

Heretofore, the functional configuration of the information processing apparatus 300 has been described in detail.

(2-4-2: Process Flow)

Figure 12:
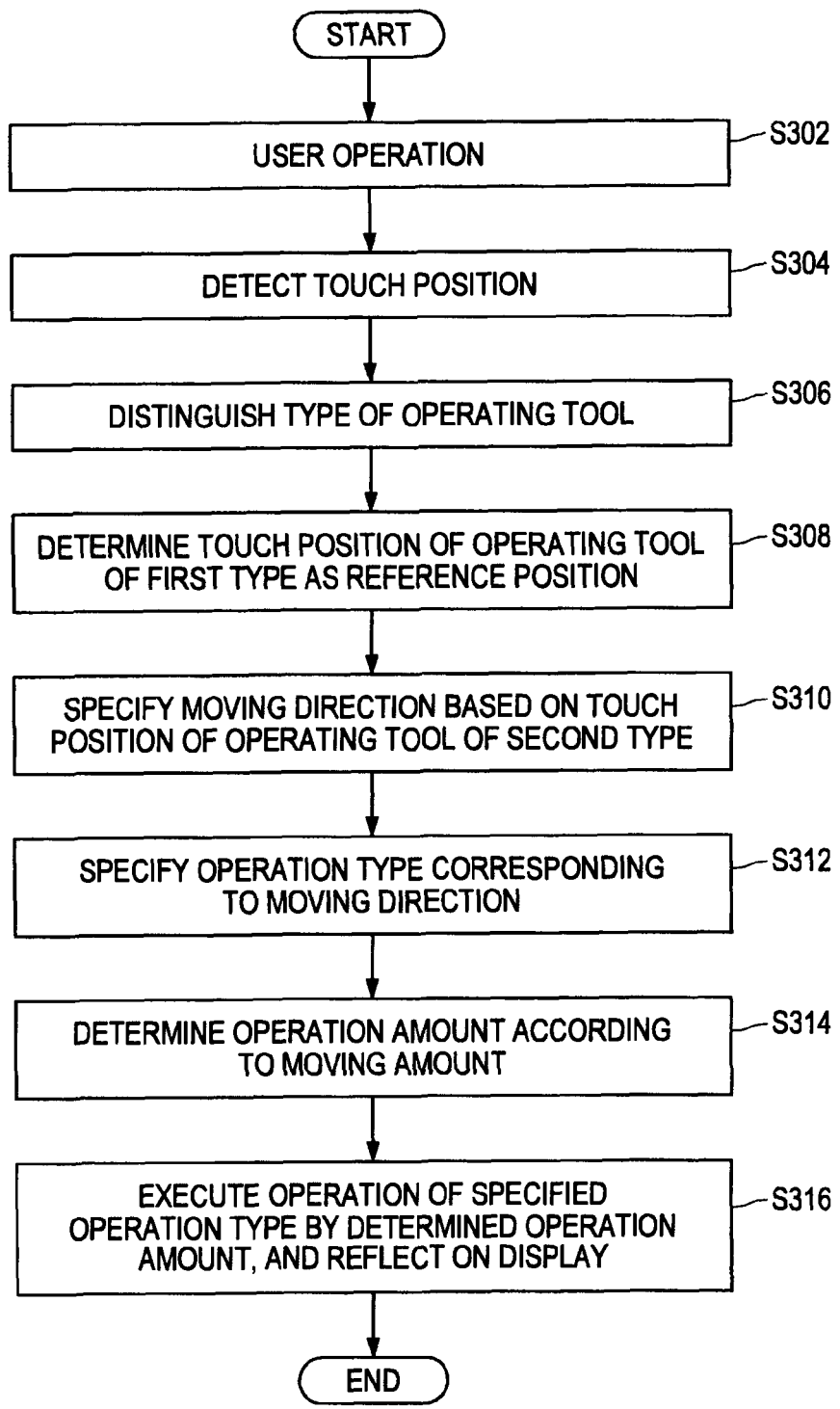
FIG. 12 is an explanatory diagram showing an overall flow of a display control method according to the modified example (modified example 2) of the present embodiment.

Next, with reference to FIG. 12, an overall flow of processes by the information processing apparatus 300 will be described. FIG. 12 is an explanatory diagram showing an overall flow of processes by the information processing apparatus 300.

As shown in FIG. 12, when a user operation is performed (S302), a touch position is detected by the position detection unit 102 (S304). At this time, some kind of indicator may be displayed by the indicator display unit 112 to clearly indicate the touch position. Also, in case of a plurality of operating tools touching the touch panel, the touch position of each operating tool is detected by the position detection unit 102 and is input to the reference position determination unit 104, the operation distinguishing unit 106 and the operation amount determination unit 108.

Furthermore, tool distinguishing information for deciding the type of the operating tool is input to the operating tool deciding unit 302 by the position detection unit 102. Then, the first operating tool and the second operating tool are determined by the operating tool deciding unit 302 based on the tool distinguishing information (S306). Then, information for specifying the first and the second operating tools (tool information) is input to the reference position determination unit 104, the operation distinguishing unit 106 and the operation amount determination unit 108.

Then, the touch position of the first operating tool is determined by the reference position determination unit 104 to be the reference position (S308). Then, reference position information indicating the reference position is input from the reference position determination unit 104 to the display control unit 110. Next, a moving direction is specified by the operation distinguishing unit 106 based on the touch position of the second operating tool (S310). Furthermore, an operation type corresponding to the specified moving direction is distinguished by the operation distinguishing unit 106 (S312). Then, operation type information indicating the operation type is input from the operation distinguishing unit 106 to the display control unit 110.

Next, an operation amount according to the moving amount of the second operating tool is determined by the operation amount determination unit 108 (S314). Then, information on the determined operation amount is input from the operation amount determination unit 108 to the display control unit 110. Next, an operation of the operation type indicated by the operation type information is performed by the display control unit 110 by the amount of the input operation amount with the reference position indicated by the reference position information as the reference, and the operation is reflected on the display on the display unit 114 (S316). As described, since a reference position can be specified by the first operating tool and an operation type and a moving amount can be specified according to the movement of the second operating tool, a display operation based on a reference position is realized by a series of seamless operations.

Heretofore, an overall flow of processes by the information processing apparatus 300 has been described.

As described above, by applying the technology according to the modified example 2, it becomes possible to specify a reference position or an operation amount (change amount) in a series of seamless operations at the time of performing display change, such as an enlargement/reduction operation or a rotation operation, based on a reference position. Also, since the specifying operation for the reference position and the specifying operation for the operation amount are separated based on the types of the operating tools, a user is enabled to perform operation without worrying about the order of touching by the operating tools. As a result, a highly convenient operating system is realized.

(2-5: Hardware Configuration Example of Information Processing Apparatuses 100, 200 and 300)

Figure 13:
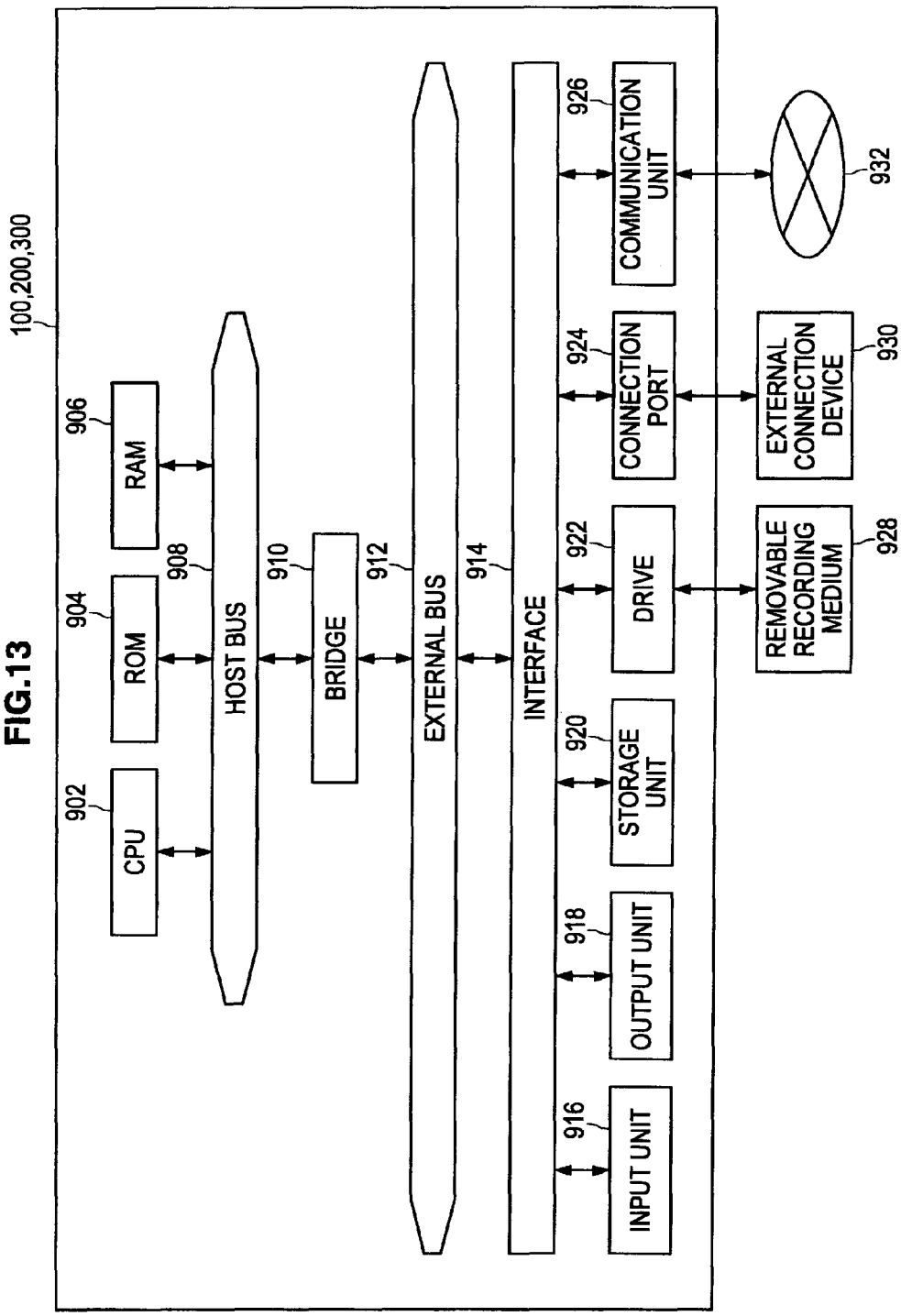
FIG. 13 is an explanatory diagram showing an example of a hardware configuration of the information processing apparatus according to the present embodiment.

The function of each structural element of the above-described information processing apparatuses 100, 200 and 300 can be realized, for example, by using the hardware configuration shown in FIG. 13. For example, the function of each structural element is realized by controlling the hardware shown in FIG. 13 by using a computer program. The mode of the information processing apparatuses 100, 200 and 300 shown is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 13, the information processing apparatus is configured mainly from a CPU 902, a ROM 904, a RAM 906, a host bus 908, a bridge 910, an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls an entire operation of the structural elements or some of the structural elements on the basis of various programs recorded on the ROM 904, the RAM 906, the storage unit 920, or a removal recording medium 928. The ROM 904 is means for storing, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program.

These structural elements are connected to each other by, for example, the host bus 908 which can perform high-speed data transmission. On the other hand, the host bus 908 is connected to the external bus 912 whose data transmission speed is relatively low through the bridge 910, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile that can visually or auditorily notify a user of acquired information.

Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device to store various data. The storage unit 920 is, for example, a magnetic storage device such as an HDD, a semiconductor storage device, an optical storage device, or a magneto-optical storage device. Moreover, the HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blue-ray medium, an HD-DVD medium, a CompactFlash (CF; registered trademark), a memory stick, or an SD memory card.

As a matter of course, the removal recording medium 928 may be, for example, an IC card on which a non-contact IC chip is mounted or an electronic device. The SD memory card is an abbreviation for Secure Digital memory card. Moreover, the IC is an abbreviation for Integrated Circuit.

The connection port 924 is a port such as an USB port, an IEEE1394 port, a SCSI, an RS-232C port, or a port for connecting an external connection device 930 such as an optical audio terminal. The external connection device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network.

For example, the network 932 is the Internet, a home-use LAN, infrared communication, visible light communication, broadcasting, or satellite communication. Moreover, the LAN is an abbreviation for Local Area Network. Also, the WUSB is an abbreviation for Wireless USB. Furthermore, the ADSL is an abbreviation for Asymmetric Digital Subscriber Line.

3: CONCLUSION

Lastly, the functional configuration of the information processing apparatus of the present embodiment, and the effects obtained by the functional configuration will be briefly described.

First, the functional configuration of the information processing apparatus according to the present embodiment can be expresses as follows. The information processing apparatus includes a display unit, a position detection unit, a reference position determination unit, a display change operation determination unit and a display control unit as described below.

An object is displayed on the display unit. The position detection unit is for detecting a position of an operating tool that is made to contact a surface of the display unit or that is brought into proximity thereof. For example, the function of the position detection unit is realized by using a sensor device such as a capacitive sensor or a press detection sensor. The reference position determination unit is for determining as a reference position a position of an operating tool that is detected first by the position detection unit when a plurality of operating tools are made to contact the display unit or were brought into proximity thereof.

In this manner, with a configuration of determining the position of an operating tool that is detected first in a user operation to be the reference position, a user can seamlessly specify the reference position in a series of operations.

Furthermore, the display change operation specifying unit is for specifying, according to a moving direction of a position of an operating tool that is an N-th (N≥2) operating tool detected by the position detection unit, a specific display change operation associated with the direction. As described above, the position of an operating tool that touched first in a user operation is determined to be the reference position. On the other hand, the position of the operating tool that touched N-th in the user operation is used for specifying a specific display change operation. Furthermore, a moving manner of the position of the operating tool that touched N-th and a specific display change operation are associated with each other. Thus, at the time of performing a desired display change operation, a user is enabled to realize the desired display change operation by simply moving the operating tool that touched N-th in a specific direction.

The display control unit is for performing on the object the display change operation specified by the display change operation specifying unit with the reference position determined by the reference position determination unit as a reference. Specifically, the display control unit performs a display change operation specified by a moving direction of the N-th touching operating tool with the position of the operating tool that touched first in the user operation (reference position) as the reference.

With this configuration, a user is enabled to seamlessly specify a reference position and operation contents in a series of operations at the time of performing a display change operation based on a reference position. As a result, a highly convenient operating system is realized.

Furthermore, the display control unit may be configured to include a reference indicator display unit and a change indicator display unit as described below. The reference indicator display unit is for making the display unit display, when a reference position is determined by the reference position determination unit, a reference indicator indicating the reference position. Also, the change indicator display unit is for making the display unit display, when a specific display change operation is specified by the display change operation specifying unit, change indicators each indicating a type of the specific display change operation or a change amount by the specific display change operation.

In this manner, by displaying the reference position and the operation contents that are seamlessly specified in a series of operations, a user is enabled to accurately grasp the details that he/she specified, and also, to perceive setup information at the time of operation.

Furthermore, the information processing apparatus may further include a type detection unit for detecting a type of the operating tool whose position was detected by the position detection unit. Furthermore, when operating tools of mutually different types are detected by the type detection unit, the reference position determination unit may determine as a reference a position of the operating tool of a first type detected by the position detection unit. Also, the display change operation specifying unit may specify, according to a moving direction of a position of the operating tool of a second type detected by the position detection unit that is different from the first type, a specific display change operation associated with the direction.

With this configuration, a user is enabled to specify the reference position and the operation contents without worrying about the order of operations.

Furthermore, when the operating tool that is detected N-th is moved in a direction associated with an enlargement operation or a reduction operation, the display control unit may enlarge or reduce the object with the reference position determined by the reference position determination unit as a centre. In this manner, the technology of the present embodiment allowing to easily and clearly specify a reference position is suitably used for enlargement or reduction of an object such as an image.

Furthermore, when the operating tool that is detected N-th is moved in a direction associated with a rotation operation, the display control unit may rotate the object with the reference position determined by the reference position determination unit as a centre. In this manner, the technology of the present embodiment allowing to easily and clearly specify a reference position is suitably used for rotation of an object such as an image.

Furthermore, the display unit may include a display area where the object is displayed and a non-display area provided outside the display screen where the object is not displayed. In this case, when a position of the operating tool is included in the display area, the reference position determination unit determines the position of the operating tool to be the reference position. Also, when the position of the operating tool is included in the non-display area, the display change operation specifying unit specifies the specific display change operation, according to a moving direction of the operating tool.

With this configuration, a user is enabled to specify the reference position and the operation contents without worrying about the order of operations.

It should be understood by those skilled in the art that various modifications, combinations, sub-combinations and alterations may occur depending on design requirements and other factors insofar as they are within the scope of the appended claims or the equivalents thereof.

For example, in the above, the description is given with the touch of an operating tool in mind. However, when an optical touch panel is used, a contact does not have to be made to detect the position of an operating tool. Also, although a finger, a stylus pen or the like is named as the type of the operating tool, other fingers such as a thumb or an index finger can also be recognized as a type of the operating tool. Also, when using fingers as the operating tools, a user may perform an operation using both hands or one hand.

The present application contains subject matter related to that disclosed in Japanese Priority Patent Application JP 2009-17193 filed in the Japan Patent Office on Jan. 28, 2009, the entire content of which is hereby incorporated by reference.

What is claimed is:

1. An information processing apparatus comprising:
a position detection unit configured to detect a position of a plurality of operating tools that are made to contact a surface of a display unit or brought into proximity thereof;
a reference position determination unit configured to determine as a reference position a position of a first operating tool of the plurality of operating tools that is detected to be contacting the display unit or to be within proximity thereof;
a display change operation specifying unit configured to specify, according to a moving direction of a position of a second operating tool of the plurality of operating tools that is detected to be contacting the surface of the display unit or to be within proximity thereof simultaneous with the detection of the first operating tool, a specific display change operation associated with the moving direction;
an operation amount determination unit configured to determine, according to a movement amount of the detected second operating tool, a specified operation amount associated with the display change operation; and
a display control unit configured to perform on an object which is displayed on the display unit the display change operation specified by the display change operation specifying unit with the reference position determined by the reference position determination unit as a reference, wherein the display control unit includes
a reference indicator display unit for making the display unit display, when the reference position is determined by the reference position determination unit, a reference indicator indicating the reference position; and a change indicator display unit for making the display unit display, when the specific display change operation is specified by the display change operation specifying unit, at least one change indicator indicating a type of the specific display change operation or a change amount by the specific display change operation.

2. The information processing apparatus according to claim 1, further comprising:
a type detection unit for detecting a type of the operating tool whose position was detected by the position detection unit, wherein,
when operating tools of mutually different types are detected by the type detection unit,
the reference position determination unit determines as a reference a position of the first operating tool of a first type detected by the position detection unit, and
the display change operation specifying unit specifies, according to a moving direction of a position of the second operating tool of a second type detected by the position detection unit that is different from the first type, a specific display change operation associated with the direction.

3. The information processing apparatus according to claim 1, wherein,
when the second operating tool is moved in a direction associated with an enlargement operation or a reduction operation, the display control unit enlarges or reduces the object with the reference position determined by the reference position determination unit as a center.

4. The information processing apparatus according to claim 1, wherein,
when the second operating tool is moved in a direction associated with a rotation operation, the display control unit rotates the object with the reference position determined by the reference position determination unit as a center.

5. The information processing apparatus according to claim 1, wherein
the display unit includes a display area where the object is displayed and a non-display area provided outside the display screen where the object is not displayed,
when a position of one of the plurality of operating tools is included in the display area, the reference position determination unit determines the one of the plurality of operating tools to be the first operating tool and further determines the position of the first operating tool to be the reference position, and
when the position of another one of the plurality of operating tools is included in the non-display area, the display change operation specifying unit specifies the another one of the plurality of operating tools to be the second operating tool and further specifies the specific display change operation, according to the moving direction of the second operating tool.

6. A display control method comprising the steps of:
detecting a position of a plurality of operating tools that are made to contact a surface of a display unit on which an object is displayed or brought into proximity thereof;
determining as a reference position a position of a first operating tool of the plurality of operating tools that is detected to be contacting the display unit or to be within proximity thereof;
specifying, according to a moving direction of a position of a second operating tool of the plurality of operating tools that is detected to be contacting the surface of the display unit or to be within proximity thereof simultaneous with the detection of the first operating tool, a specific display change operation associated with the moving direction;
determining, according to a movement amount of the detected second operating tool, a specified operation amount associated with the display change operation; and
performing on the object the display change operation specified in the step of specifying with the reference position determined in the step of determining as a reference,
wherein when the reference position is determined, a reference indicator is displayed to indicate the reference position; and
wherein when the specific display change operation is specified, at least one change indicator is displayed to indicate a type of the specific display change operation or a change amount by the specific display change operation.

7. The information processing apparatus according to claim 1, wherein the type detection unit is further configured to determine the type of each individual one of the plurality of operating tools based on tool distinguishing information comprising information regarding physical traits of the plurality of operating tools.

8. The information processing apparatus according to claim 1, wherein a correlation range between the movement amount and the operation amount is determined and set by a user.

9. The information processing apparatus according to claim 1, wherein the reference position remains placed at the position of the first operating tool as the display control unit performs the display change operation on the object.

10. The information processing apparatus according to claim 1, wherein the first operating tool remains in contact with or in proximity to the surface of the display unit as the second operating tool is detected to move by the moving amount in the moving direction.

11. The information processing apparatus according to claim 1, wherein the display change operation specifying unit specifies an enlargement operation according to the detected moving direction of the position of the second operating tool and the display control unit performs the enlargement operation on the object by enlarging the displayed object with the reference position as a center of enlargement.

12. The information processing apparatus according to claim 11, wherein the position of the second operating tool is moved by a dragging operating in a vertical direction, and the detected moving direction is the vertical direction.

13. The information processing apparatus according to claim 1, wherein the display change operation specifying unit specifies a rotation operation according to the detected moving direction of the position of the second operating tool and the display control unit performs the rotation operation on the object by rotating the displayed object with the reference position as a center of rotation.

14. The information processing apparatus according to claim 1, wherein when an enlargement operation is specified by the display change operation specifying unit, the change indicator display unit makes the display unit display the change indicator indicating an amount of enlargement of the object.

15. The information processing apparatus according to claim 1, wherein when a rotation operation is specified by the display change operation specifying unit, the change indicator display unit makes the display unit display the change indicator indicating an amount of rotation of the object.

16. The information processing apparatus according to claim 1, wherein the first operating tool of the first type and the second operating tool of the second type are distinguishable based upon at least one of detected electromagnetic characteristics and pressing power upon the surface of the display unit.

17. The display control method according to claim 6, further comprising the step of:
    detecting a type of the operating tool whose position was detected by the position detection unit, the detecting comprising determining the type of the operating tool based on tool distinguishing information comprising information regarding physical traits of the operating tool.

18. The display control method according to claim 6, wherein the type of each individual one of the plurality of operating tools is determined based on tool distinguishing information comprising information regarding physical traits of the plurality of operating tools.

19. The display control method according to claim 6, wherein the reference position remains placed at the position of the first operating tool as the display change operation is performed on the object.

20. The display control method according to claim 6, wherein the first operating tool remains in contact with or in proximity to the surface of the display unit as the second operating tool is detected to move by the moving amount in the moving direction.

\* \* \* \* \*